United States Patent
Kuhstrebe et al.

(10) Patent No.: US 7,207,922 B2
(45) Date of Patent: Apr. 24, 2007

(54) MOTOR VEHICLE COMPRISING A DRIVE TRAIN HAVING A MULTIPLE CLUTCH DRIVE

(75) Inventors: Jochen Kuhstrebe, Westheim (DE); Olaf Moseler, Würzburg (DE); Axel Rohm, Schonungen (DE); Eduard Steiner, Rottendorf (DE); Rainer Reuthal, Unterpleichfeld (DE); Hans-Jürgen Schneider, Werneck-Stettbach (DE); Wolfgang Kundermann, Schweinfurt (DE); Jörg Sudau, Niederwerrn (DE); Thomas John, Sulzheim (DE); Thomas Strasser, Schweinfurt (DE)

(73) Assignee: Volkswagen AG, Wolfsburg (DE)

( * ) Notice: Subject to any disclaimer, the term of this patent is extended or adjusted under 35 U.S.C. 154(b) by 23 days.

(21) Appl. No.: 11/141,924

(22) Filed: Jun. 1, 2005

(65) Prior Publication Data

US 2005/0261108 A1 Nov. 24, 2005

Related U.S. Application Data

(62) Division of application No. 10/466,349, filed on Jul. 14, 2003, now Pat. No. 6,951,526.

(51) Int. Cl.
*F16H 59/00* (2006.01)
*F16H 61/00* (2006.01)
*F16H 63/00* (2006.01)
*F16H 59/60* (2006.01)
*F16H 59/62* (2006.01)

(52) U.S. Cl. .............................. 477/97; 477/70; 74/335
(58) Field of Classification Search .................. 74/335; 477/36, 50, 70, 97
See application file for complete search history.

(56) References Cited

U.S. PATENT DOCUMENTS

| | | | |
|---|---|---|---|
| 2,630,893 A | 3/1953 | Misch et al. | |
| 3,760,918 A | * 9/1973 | Wetrich et al. | .......... 192/87.11 |
| 4,301,904 A | 11/1981 | Ahlen | |
| 4,576,063 A | 3/1986 | Akashi et al. | |

(Continued)

FOREIGN PATENT DOCUMENTS

DE 30 37 990 5/1982

(Continued)

OTHER PUBLICATIONS

VDI Berichte 1323 Verein Deutscher Ingenieure, Mar. 1997.

*Primary Examiner*—Tisha Lewis
(74) *Attorney, Agent, or Firm*—Cohen Pontani Lieberman & Pavane LLP

(57) ABSTRACT

A power train for a motor vehicle is configured with a control unit operable to increase or decrease the flow of operating fluid as a function of the instantaneous demand for the supply of the operating fluid to at least one of multiple clutch arrangements in such a way that the control unit decreases or interrupts the flow of operating fluid when the supply demand is low and increases the flow of operating fluid unit when the supply demand is high.

8 Claims, 7 Drawing Sheets

U.S. PATENT DOCUMENTS

| | | | |
|---|---|---|---|
| 4,603,596 A | 8/1986 | Akashi et al. | |
| 4,660,441 A | 4/1987 | Young | |
| 4,714,147 A | 12/1987 | Szodfridt et al. | |
| 5,125,282 A | 6/1992 | Bender et al. | |
| 5,159,855 A | 11/1992 | Nikolaus et al. | |
| 5,181,431 A | 1/1993 | Zaiser et al. | |
| 5,319,963 A | 6/1994 | Benford | |
| 5,407,401 A | 4/1995 | Bullmer et al. | |
| 5,503,039 A | 4/1996 | Bailly et al. | |
| 5,643,136 A | 7/1997 | Kono et al. | |
| 5,803,863 A | 9/1998 | Hayward et al. | |
| 5,890,392 A | 4/1999 | Ludanek et al. | |
| 5,893,816 A | 4/1999 | Ashida | |
| 5,915,512 A | 6/1999 | Adamis et al. | |
| 5,950,781 A | 9/1999 | Adamis et al. | |
| 6,145,398 A | 11/2000 | Bansbach et al. | |
| 6,378,675 B1 | 4/2002 | Kundermann et al. | |
| 6,454,074 B1 | 9/2002 | Kundermann et al. | |
| 6,464,059 B1 | 10/2002 | Kundermann et al. | |
| 6,491,149 B1 | 12/2002 | Kundermann et al. | |
| 6,499,578 B1 | 12/2002 | Kundermann et al. | |
| 6,523,657 B1 | 2/2003 | Kundermann et al. | |
| 6,675,668 B2 | 1/2004 | Schamscha | |
| 6,712,734 B1 | 3/2004 | Loeffler | |
| 6,715,597 B1 * | 4/2004 | Buchanan et al. | 192/70.12 |
| 7,021,422 B2 * | 4/2006 | Busold et al. | 192/87.13 |
| 2004/0074732 A1 | 4/2004 | Busold et al. | |
| 2005/0067251 A1* | 3/2005 | Braford et al. | 192/70.12 |

FOREIGN PATENT DOCUMENTS

| | | |
|---|---|---|
| DE | 35 26 630 | 2/1987 |
| DE | 41 36 583 | 5/1993 |
| DE | 42 04 401 | 8/1993 |
| DE | 195 30 233 | 2/1997 |
| DE | 197 29 354 | 1/1998 |
| DE | 196 31 983 | 2/1998 |
| DE | 199 37 455 | 4/2000 |
| DE | 198 50 549 | 5/2000 |
| DE | 199 14 428 | 11/2000 |
| DE | 199 39 819 | 11/2000 |
| DE | 199 44 179 | 1/2001 |
| DE | 100 04 179 | 4/2001 |
| DE | 100 04 186 | 4/2001 |
| DE | 100 04 189 | 4/2001 |
| DE | 100 04 190 | 4/2001 |
| DE | 100 04 195 | 4/2001 |
| DE | 199 50 696 | 4/2001 |
| DE | 100 60 699 | 6/2001 |
| DE | 100 34 730 | 8/2001 |
| DE | 101 18 756 | 5/2002 |
| DE | 101 28 856 | 5/2002 |
| EP | 0 301 724 | 2/1989 |
| EP | 0 976 955 | 2/2000 |
| FR | 2 790 297 | 9/2000 |
| GB | 2 315 305 | 1/1998 |
| JP | 57 091376 | 6/1982 |
| JP | 58 088250 | 5/1983 |
| JP | 01 312254 | 12/1989 |
| JP | 03 096760 | 4/1991 |
| JP | 07 019337 | 1/1995 |
| JP | 07 139 620 | 5/1995 |
| JP | 07 259895 | 10/1995 |
| JP | 09 133207 | 5/1997 |
| WO | WO 200240886 A1 * | 5/2002 |

* cited by examiner

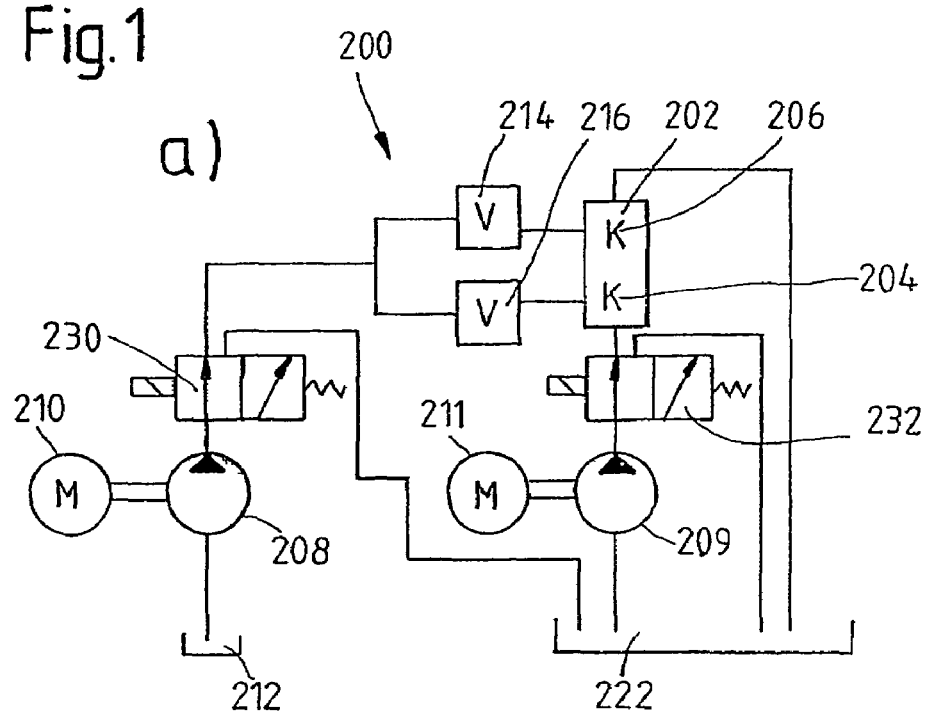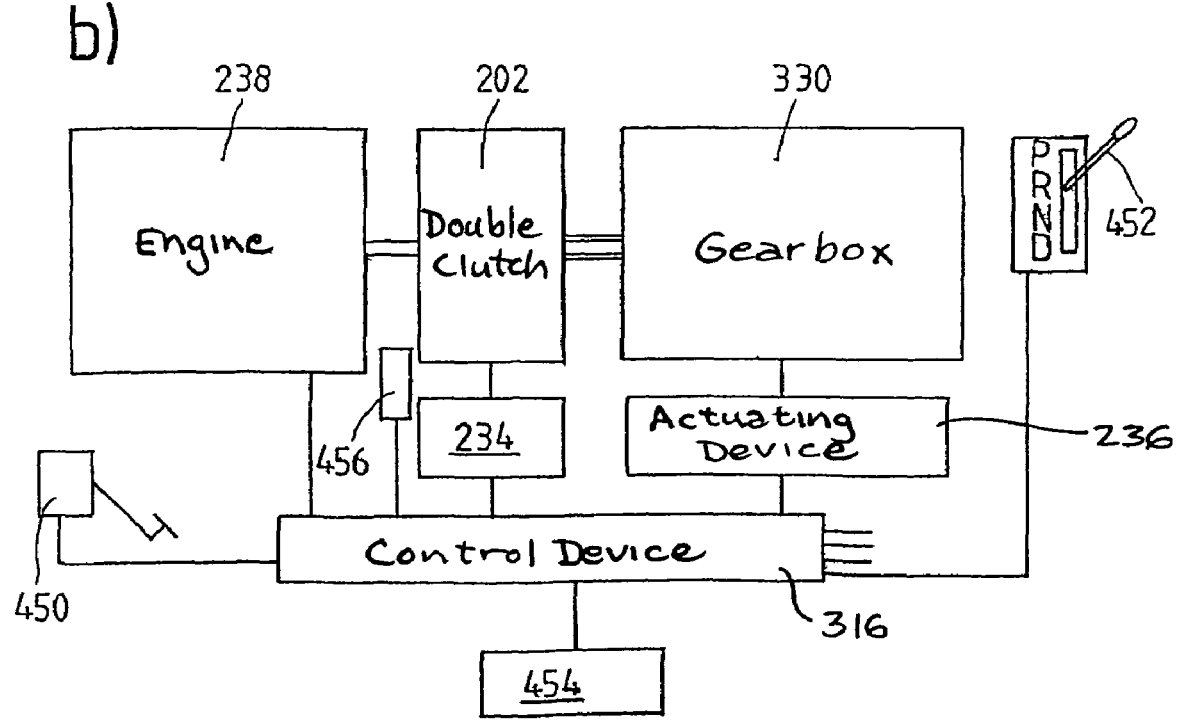

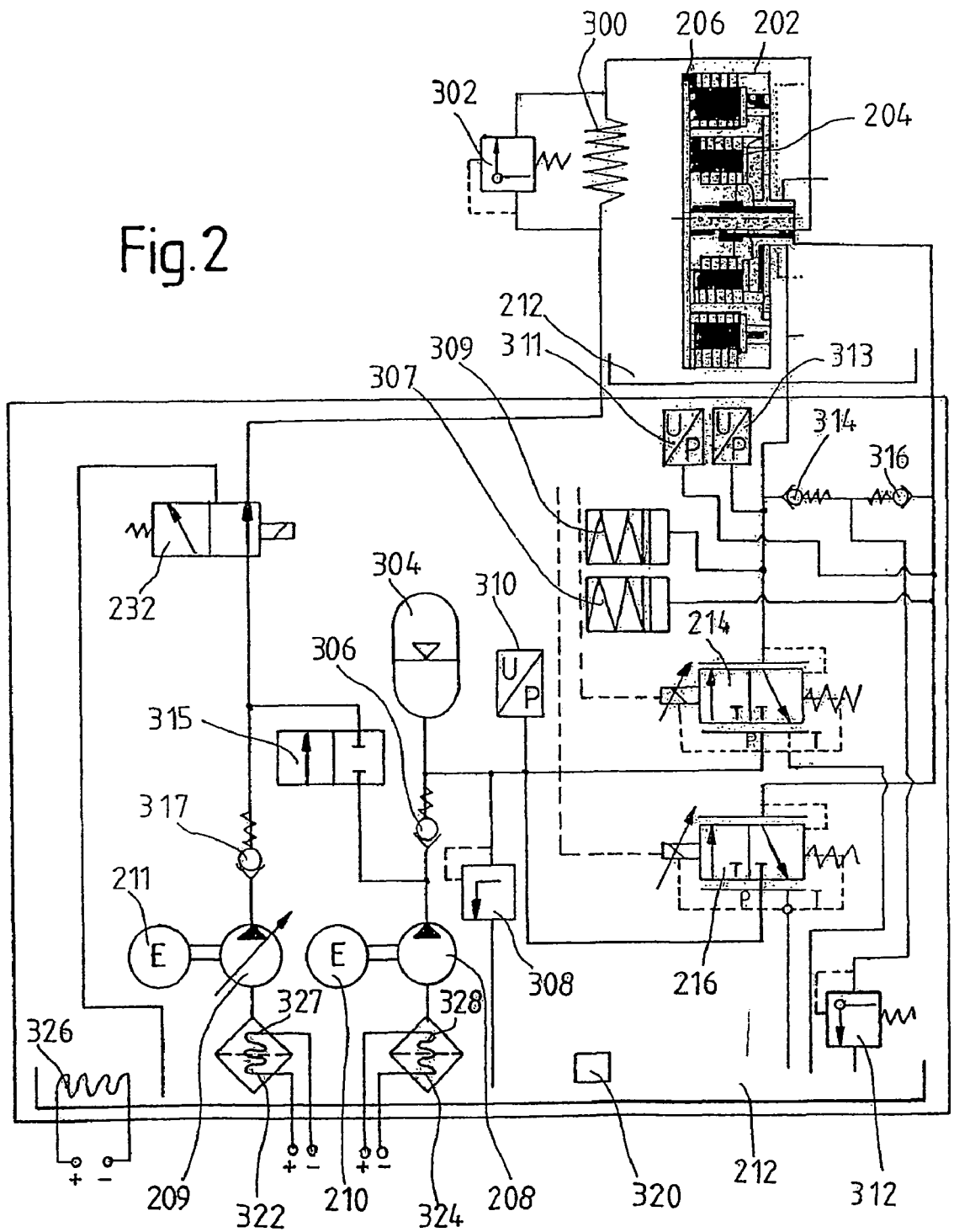
Fig. 2
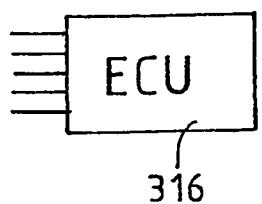

MOTOR VEHICLE COMPRISING A DRIVE TRAIN HAVING A MULTIPLE CLUTCH DRIVE

CROSS REFERENCE TO RELATED APPLICATIONS

This application is a Divisional of U.S. patent application Ser. No. 10/466,349, filed Jul. 14, 2003 now U.S. Pat. No. 6,915,526, which claims priority from Applications filed in Germany on Jan. 12, 2001, No. 101 01 176.8, Germany on Oct. 1, 2001, No. 101 48 424.0, respectively. The disclosure of U.S. patent application Ser. No. 10/466,349 is incorporated herein by reference.

BACKGROUND OF THE INVENTION

1. Field of the Invention

TECHNICAL AREA

According to several primary aspects, the invention pertains in general to a so-called multi-clutch device, possibly a double clutch device, for installation in the power train of a motor vehicle between a drive unit and a gearbox, where the clutch device has a first clutch arrangement assigned to a first gearbox input shaft and a second clutch arrangement assigned to a second gearbox input shaft for the transmission of torque between the drive unit and the gearbox, and where the clutch arrangements are designed as disk clutch arrangements, to which an operating fluid, especially a cooling oil, can be supplied for operation under the action of the operating fluid (especially for wet-running operation). In this context, the idea of the invention pertains especially (but not exclusively) to a clutch device of the type in which the disk clutch arrangements can be actuated hydraulically by means of hydraulic slave cylinders integrated into the clutch device.

2. Description of the Related Art

These types of clutch devices have been proposed by the applicant in various patent applications. Reference can be made by way of example to DE 100 04 179 A1, the disclosure of which is included in its entirety by reference in the present application.

According to this primary aspect, the invention also pertains to a power train, which has a drive unit, a gearbox (possibly a power-shift gearbox) with a first gearbox input shaft and a second gearbox input shaft, and a clutch device of the type indicated above, as well as to a motor vehicle comprising this type of power train. In this context, the invention pertains in particular to the idea of assigning an actuator arrangement and a control unit, which controls the actuator arrangement, to the gearbox, which is preferably designed as a power-shift gearbox, so that the gears assigned to the first and the second gearbox input shafts can be engaged and disengaged.

To prevent the disks (especially disks with linings) from wearing down or burning, it is necessary to lubricate/cool them with an operating fluid (especially a cooling oil). Oils normally used for these types of applications have a low viscosity at their working temperature (approximately 90° C.), so that, when the clutch arrangements are open (pressureless hydraulic actuating cylinder in the case of a hydraulically actuatable clutch arrangement of the NORMALLY OPEN type), the drag torques caused by the oil present between the disks are comparatively low (less than, for example, 2 Nm). If, however, the temperature of the oil is very low (for example, considerably below 0° C.), as may be the case, for example, after the motor vehicle has been shut off overnight in the winter, there is a drastic increase in the viscosity of the oil, resulting in very high drag torques (as high as 25 Nm). In addition to these drag torques, breakloose or loosening torques of up to 50 Nm or more can occur when the disks are sticking together; it is necessary to apply these torques only once, however, at the beginning of vehicle operation, to separate the adhering disks from each other. After these disks have been separated, however, the drag torques persist until the viscosity of the oil has decreased as a result of the warming-up of the engine and the introduction of heat (frictional energy) into the clutch arrangements.

As a result these high drag or adhesion torques, it can become impossible in practice to engage a gear, because the synchronizing devices of the gearbox are usually not designed to overcome such high torques. In the typical case, the synchronizing devices are designed for torques on the order of 5 Nm. If no gears can be engaged or shifted, it is not possible to drive the vehicle.

In German Patent Applications Nos. 101 28 856.5 (Filing Date of the Application: Jun. 15, 2001; title: "Clutch System with at Least One Disk Clutch Arrangement, Power Train with the Clutch System, and Warm-Up Process for the System") and 101 18 756.4 (Filing Date of the Application: Apr. 17, 2001; title: "Clutch System"), various proposals were made which can at least reduce the severity of the problems described above. The approaches to the solutions and the solutions presented in these applications can also be advantageously applied in conjunction with the proposals offered here in the following. The disclosure content of the two applications cited above is included completely by reference in the disclosure of the present application.

SUMMARY OF THE INVENTION

The present invention also has the goal of solving or at least reducing the severity of the problems discussed above, and in particular of making it easier to control them.

In accordance with a first primary aspect. According to the invention, it is provided that the control unit is designed to automatically engage at least one gear by means of the actuator arrangement in response to the parking of the vehicle.

This proposal is based on the idea, among others, of engaging at least one gear or certain gears even while the still-operating vehicle is being parked. For example, a total of two gears can be engaged, namely, one for the first gearbox input shaft and one for the second gearbox input shaft.

There are various possibilities in principle by which the control unit can detect that the motor vehicle is being parked or about to be parked. If a manually operated selector is used to select from among various operating modes of the vehicle and/or of the gearbox, the control unit can engage the minimum of one gear in response to the selection of parking mode (P). It is proposed in general that the control unit be designed to automatically engage at least one gear by means of the actuator arrangement in response to the parking of the vehicle when at least one positive condition is fulfilled and/or at least one negative condition is not fulfilled. For example, the control unit can be designed to automatically engage at least one gear by means of the actuator arrangement in response to the parking of the vehicle when the external temperature at the time in question is below a threshold value. When the vehicle is being parked, however, it is difficult to know what the outside temperature is going to be in the coming period of time (coming hours/days/weeks) and thus to know what the temperature of the operating fluid (especially the temperature of the oil) is going to be. The minimum of one gear should therefore be engaged not only when the outside temperatures are very low, but also when they are higher. It is also conceivable that, in certain situations, such as when the driver gives a corresponding "negative command", no gear will be engaged when the vehicle is parked.

It has already been discussed in principle that the control unit can be advantageously designed to automatically engage at least one gear assigned to the first gearbox input shaft and at least one gear assigned to the second gearbox input shaft by means of the actuator arrangement in response to the parking of the vehicle. In this context, the idea of the invention pertains especially to the fact that a lower or intermediate forward gear and reverse gear number among the gears which are to be or have been engaged. As a rule, it will be sufficient for the control unit to be designed to automatically engage, by means of the actuator arrangement, precisely one gear assigned to the first gearbox input shaft and precisely one gear assigned to the second gearbox input shaft. Of the engaged gears, one is preferably a low or intermediate forward gear, and the other is preferably the reverse gear.

It is proposed as being especially preferred that first or second gear be engaged as the low or intermediate forward gear. That is, the gears engaged upon parking should make it possible for the vehicle to be moved both forward and backward so that it can be driven if necessary backwards and/or forwards out of a parking space between two other vehicles or some other type of parking location. It therefore appears advisable to engage either gears (1 and R) or the gears (2 and R). The choice between 1 and 2 depends on the design of the gearbox. For example, if the gears R-1-3-5 are assigned to one gearbox input shaft and gears 2-4-6 are assigned to the other gearbox input shaft, then the simultaneous engagement of gear 1 and reverse R is not possible. But it is also quite conceivable that, for example, 1st gear or 2nd gear could be present on both gearbox input shafts. In this case, there would be a free choice between (1 and R) and (2 and R). In general, it is recommended that a higher forward gear be preferred over a lower forward gear. Because of the low temperature of the operating fluid, it is impossible under certain conditions to shift during the first minutes after the engine has been started. A higher forward gear thus gives the driver the ability to reach higher speeds than would be the case, for example, in 1st gear. Thus, basically the combinations (3 and R), (4 and R), etc., are also conceivable. Nevertheless, a higher gear can cause problems when it is desired to drive uphill carrying or pulling a heavy load. Here again, a lower forward gear would tend to be advisable. The choice (2 and R) thus appears especially advantageous. This combination offers a compromise between the maximum achievable driving speed and a sufficiently high starting torque at the drive wheels.

One might ask what the purpose could be of engaging several gears assigned to the same gearbox input shaft. This measure, however, gives the driver the opportunity, when starting the vehicle, to choose the gear which is especially suitable for driving off in the specific situation from among the gears assigned to the gearbox input shaft in question. The other gears would then be disengaged. Another concrete possibility of using this measure is derived from the fact that the gearbox is blocked when two gears assigned to the same gearbox input shaft are engaged. It is proposed that this effect can be exploited to provide the vehicle with a "parking brake". The control unit can therefore be designed to automatically engage at least two gears assigned to the same gearbox input shaft by means of the actuator arrangement in response to the parking of the vehicle in such a way that the gearbox is blocked and thus acts as a parking brake for the vehicle.

The control unit can be advantageously designed to automatically disengage the minimum of one gear which was engaged by the actuator arrangement when the vehicle was parked upon the occurrence of a disengagement condition. Thus, if a manually operated selector is provided for selecting from among the various vehicle modes and/or gearbox modes, it can be advisable for the control unit to disengage the minimum of one gear in response to the selection of neutral mode (N). This proposal is based on safety considerations and has the goal of preventing the gearbox from being operated improperly and thus of preventing damage to it. It is possible for the engaged gears to be disengaged when a shifting element (such as a shift lever) is moved to N; but it is also possible for the engaged forward gear and the engaged reverse gear not to be disengaged when a shift occurs between D and R via N, for example, so that it is possible to shift between driving forward and driving in reverse. The gears would therefore be disengaged only when the shifting element is moved to the N position. It is also quite possible, however, that simply shifting via the neutral mode such as between D and R leads to a disengagement of the gears, after which the vehicle moves or must move in normal mode.

As a further elaboration or generalization, it is proposed that the control unit be designed to disengage the minimum of one gear only when at least one positive condition is fulfilled and/or at least one negative condition is not fulfilled. For example, under certain conditions (such as an oil temperature below a threshold value and/or an outside temperature below a threshold value), the minimum of one gear can remain engaged in neutral mode, because there may be a situation in which it is found during an attempt to engage a gear that the gears can no longer or cannot yet be engaged because of excessive drag torques. It should also be remembered that situations may arise in which the motor vehicle must be towed. The control unit can be designed to recognize a tow-away mode. It would also be possible for such a mode to be selected manually. If a tow-away mode is provided, then the gears or the gear should be disengaged in this mode despite the presence of the conditions applicable in neutral mode which indicate that the gears should in fact not be disengaged.

In the discussion presented above, it was already implied that, in preparation for starting the vehicle, the control unit can be advantageously designed to automatically disengage all of the several gears which were engaged by the actuator arrangement when the vehicle was parked except for one, which is suitable for starting off and which is possibly selected by the driver by means of a manually operated selector. In this case, no more than one gear remains engaged per gearbox input shaft. Preferably a low or intermediate forward gear and reverse gear remain engaged.

According to another aspect, which does not necessarily pertain to the problems discussed above, the motor vehicle, in particular its power train, is designed with a parking brake.

According to the invention, the parking brake is based on the engagement of at least two of the gears assigned to the same gearbox input shaft.

In general, the parking brake is based on the engagement of at least two of the gears assigned to the gearbox input shaft, even where only one input shaft and one clutch arrangement are provided.

Reference is to be made again here to the problems discussed at the beginning. As a rule, it cannot be completely excluded that a motor vehicle according to the invention will be parked in a state in which no gear is engaged. It is possible, furthermore, that only one gear will be engaged, such as a forward gear, but that a reverse gear is required to drive off. It is also possible that there is no wish to apply the above inventive proposal according to the first primary aspect.

According to the invention, it is provided under a second independent primary aspect that the actuator arrangement is designed to bring shifting elements of the gearbox into a pretensioned state, in which these mechanically pretensioned shifting elements try to engage the associated gear, and that the control unit is designed to control the actuator arrangement while the drive unit is not running in such a way as to engage at least one gear not engaged at that particular moment or at least to bring the shifting element assigned to this gear into a pretensioned state.

If it is assumed that no gear or only one gear is engaged and that now it is desired to engage a drive-off gear or at least one other gear, the selector forks of the gears (e.g., reverse gear and 2nd gear) or of the gear, for example, are, according to this inventive proposal, actuated by the actuator (the actuator arrangement). The gear or the gears can engage, however, only when, for example, the shifting teeth of the clutch body of the gear wheel in question line up with the gaps between the teeth of the mating gear wheel of the sliding selector sleeve of the synchronizing device (a synchronizing device of the standard design according to the state of the art is assumed here by way of example). If the tooth flanks meet, the gear or gears cannot engage. In this example according to the invention, the selector forks are mechanically pretensioned by the actuator in this case.

When now, for example, a starter motor is actuated while the clutches are released, the gear wheels on the clutch or drive unit side (engine side) move, because, even though the clutches are open, the break-loose and drag torques keep the power train connected to the engine to a certain extent (under the assumption that the temperature of the operating medium is in the range where such torques occur). The gear wheels on the gearbox takeoff side, however, remain motionless, because a parking brake is still engaged and/or because the vehicle is stationary with a released parking brake. As a result of the relative movement which occurs, finally, a position is reached in which the teeth of the gear wheels on the engine side line up with the gaps between the teeth on the gear wheels on the power takeoff side. Because of the pretension which is present, the gear can slide into engagement.

It can be advantageous to design the control unit to control or to actuate an electric machine, which acts directly or indirectly on at least one of the gearbox input shafts and/or on a power takeoff shaft of the drive unit and/or on a gearbox output shaft in such way that at least one of the shafts is turned. As a result, the pretensioning makes it possible for the gear in question to be engaged, as just explained in detail above on the basis of a concrete example.

The gear in question can be engaged effectively and in an especially reliable manner by designing the control unit to rotate the shaft under the intermediate action of the electric machine in a defined manner into a rotational position in which, following the concomitant rotation of at least one gear-engaging element of the gearbox, the gear can finally be engaged or in which it is at least easier for the gear to be engaged. The electric machine can be designed as a crankshaft starter-generator or starter, which is assigned to the drive unit, which can be either in the form of an internal combustion engine or an electric drive unit.

If a continuously actuatable starter such as a crankshaft starter-generator or an electric hybrid drive is available, then the crankshaft, for example, can be positioned by way of this type of electric drive in such a way that at least one gear can be engaged. Additional gears can be engaged by continuing to turn the crankshaft.

So that the drive unit can be started reliably or so that the shaft can continue to turn even at low outside temperatures, a/the starter (which is assigned to the drive unit designed as an internal combustion engine) or the electric machine should be able to generate, at least for a short period of time, a torque sufficient to overcome the break-loose torques and drag torques of the clutch arrangements associated with the elevated viscosity of the operating fluid at low temperatures and the countertorques of the drive unit. With respect to the starting of the drive unit, this elaborative proposal also relates to the inventive proposals according to the first primary aspect of the invention (parking the vehicle with at least one gear engaged). The control unit can be advantageously designed to reduce the countertorques of the drive unit by acting on the drive unit during a rotational acceleration phase.

According to the elaborative proposals addressed here, it is therefore recommended that the "electric drive" mentioned above be designed with enough power to overcome the break-loose and drag torques of both clutch arrangements and—in the case of an internal combustion engine— the compression and friction of the engine forming the drive unit. If the internal combustion engine has devices for reducing or releasing the compression (such as, for example, a variable cam or camshaft adjustment device, decompression valves, or electrically actuated intake and/or exhaust valves), these should be used to relieve the load on the electric drive briefly during the crankshaft acceleration phase. The required starting torques can thus be reduced.

According to a third primary aspect of the invention, it is proposed, that the actuator arrangement be designed to exert actuating forces greater than the normal actuating forces on shifting elements of the gearbox and/or synchronizing elements assigned or belonging to these shifting elements; and that the control unit be designed to increase the actuating forces to these higher values when necessary and to limit them with respect to time.

The idea here, for example, is for the gearbox-actuating mechanism to apply a very strong force (e.g., 2,000 N) for a short period of time to engage the gear or gears. This force is greater than that (e.g., 500 N) which can be applied for a prolonged period of time to the synchronizing device (e.g., to the synchronizing rings).

According to the inventive proposal, the synchronizing elements perform a synchronization which is "normal" in and of itself, but the process is executed for a short period of time in what could be described as "overload mode". The gear can then be engaged while the drive unit is running. If the vehicle is still stationary, it is recommended that the actuator arrangement be allowed to actuate the gearbox in this way only if a foot brake or the like has been actuated and/or a parking brake is engaged, so that the vehicle will not suddenly accelerate as a result of the drag and break-loose torques in the clutch arrangement in question. In general, the control unit can be designed to increase the actuating forces when at least one positive condition is fulfilled and/or at least one negative condition is not fulfilled.

According to a fourth aspect of the invention, it is proposed for a motor vehicle comprising a power train wherein the gearbox has shifting elements assigned to the gears and synchronizing elements assigned or belonging to the shifting elements; and wherein, in order to engage a gear (called the "target gear" in the following), at least one synchronizing element assigned to the target gear can be activated by the actuator arrangement to synchronize at least one gearbox shaft assigned to the target gear, especially the gearbox input shaft assigned to the target gear, that to engage the target gear, at least one synchronizing element assigned to at least one other gear can also be activated by the actuator arrangement to synchronize the gearbox shaft assigned to the target gear.

At the same time, it is also possible for the actuator arrangement to have, for example, several actuators which can be actuated independently of each other. The inventive proposal is based on the idea of using several synchronizing units or elements to apply the synchronizing forces required in view of the break-loose torque and/or the drag torques (which are higher than those occurring during normal operation). For example, one or more selector forks can be assigned to an actuator. Let it be assumed, for example, that 1st gear is to be engaged. If all of the synchronizing units mounted on the shaft in question can be actuated simultaneously, they can also be used to brake or to accelerate the gearbox input shaft. In the case of a power-shift gearbox, therefore, the synchronizing units of 1st, 3rd, and 5th gears, for example, could be used to brake the gearbox input shaft assigned to these gears. It should be guaranteed, however, that two or more gears are not engaged suddenly while the gearbox input shaft is decelerating (in general: when the gearbox input shaft is approaching a synchronous point). In this regard it is proposed that an appropriate safety function be provided, which prevents the other gear from being engaged unintentionally. The safety function ensures, for example, that the synchronizing units/sliding selector sleeves of 3rd and 5th gears travel only a limited distance, i.e., just enough to make it possible to brake the gearbox input shaft, but not enough to engage the gear in question.

It can be advantageous in this context to monitor the rpm's of the shafts in particular. Thus the approach to a synchronous point could be recognized on the basis of the vehicle velocity, which, for example, can be determined by a gearbox output speed sensor or from the rpm's of the wheels (with a certain degree of uncertainty resulting from the vibrations of the power train and the power of resolution of the wheel rpm sensors at low vehicle velocities), and on the basis of the speed of the gearbox input shaft which is to be braked or accelerated, this value also being measured by an rpm sensor. On the basis of this information, the actuating mechanism of the "other gear" (which is used to brake the shaft but is not to be engaged) is controlled is such a way that it reduces the actuating force shortly before the synchronous point is reached and thus prevents this gear from being engaged. More generally, it is proposed that the control unit be designed to detect an approach to a synchronous point assigned to the other gear on the basis of detected rpm's and to increase or to decrease the actuating forces acting on at least one shifting element and/or synchronizing element assigned to the other gear before the synchronous point is reached in order to prevent the other gear from being engaged.

It will often be advantageous for the control unit to be designed to command the actuator arrangement to actuate the minimum of one synchronizing element assigned to the minimum of one other gear as needed when at least one positive condition is fulfilled and/or at least one negative condition is not fulfilled. It can be provided in particular that, at normal temperatures, i.e., at the normal viscosity of the operating fluid, a synchronizing element assigned to at least one other gear is not actuated.

In regard to aspects of the invention which have been discussed above and which have the goal of solving the problems discussed above, it appears advantageous for safety reasons for it to be possible to block and to release the starting of the drive unit as a function of an actuation and non-actuation of a vehicle brake system and/or as a function of the state of a manually operated selector device for selecting various vehicle modes and/or gearbox modes and/or as a function of the vehicle mode and/or gearbox mode in effect at the moment in question. This elaborative proposal, however, is also of interest independently of the aspects of the invention discussed above.

According to a fifth aspect of the invention, it is provided that the starting of the drive unit can be blocked and released as a function of the actuation and nonactuation of a vehicle brake system and/or as a function of the state of a manually operated selector device for the selection of various vehicle modes and/or gearbox modes and/or as a function of the vehicle mode or gearbox mode in effect at the moment in question.

This inventive proposal is based on an analysis of the starting process. If at least one gear is engaged while the drive unit is not running, and if then the drive unit is put into operation, it would be possible, because of the drag or break-loose torques present at low temperatures, for the vehicle to experience a sudden acceleration, which is not under the driver's control and over which the driver possibly could no longer gain control. This can be prevented by taking measures to ensure that, when the driver starts the drive unit (especially the engine), he/she will actuate, for example, the foot brake and/or will select parking mode P by means of a driving mode selector lever or the like. The drag torque, reduced by the reduction ratio of the engaged gear, then works in opposition to the parking brake. The parking brake must therefore be designed to be sufficiently sturdy. An advantageous design of the parking brake, which was discussed above, consists in engaging two or more gears on one gearbox input shaft. To disengage the parking brake, it is then sufficient to decrease the number of engaged gears per gearbox input shaft to one. In addition, as also previously discussed, the starter must be designed not only with the capacity to overcome the drag torque but also to accelerate the engine.

It is possible to start drive unit without restrictions when no gear is engaged at that particular moment because position N (neutral mode), for example, has been selected by means of the driving program selector lever or the like. Even at low temperatures, at least one gear can then be engaged, in spite of the low temperatures, if the motor vehicle is designed in accordance with the invention. Reference is made to the inventive proposals presented above.

Also for the purpose of providing a high degree of protection against uncontrolled accelerations, it is also proposed for all of the aspects of the invention pertaining to the problems discussed above, that a change from the vehicle mode and/or gearbox mode in effect at a particular moment to a different vehicle mode and/or gearbox mode by corresponding operation of a manually operated selector device for the selection of various vehicle modes and/or gearbox modes can be blocked and released as a function of an actuation and nonactuation of the vehicle brake system, and/or that the change to a different vehicle mode and/or gearbox mode by the corresponding operation of the selector device is or can be positively coupled with an actuation of the vehicle brake system. This proposal is also of interest independently of these aspects of the invention.

According to a sixth primary aspect, the invention thus proposes that a change from a vehicle mode and/or gearbox mode present at a particular moment to another vehicle mode and/or gearbox mode by the appropriate operation of a manually operated selector device for selecting various vehicle modes and/or gearbox modes can be blocked and released as a function of an actuation and nonactuation of the vehicle brake system, and/or that the change to the other vehicle mode and/or gearbox mode by appropriate operation of the selector device is or can be positively coupled with the actuation of the vehicle brake system.

It can be provided, for example, that shifting from P or N to D or R is allowed only if the braking torque being applied by the driver is strong enough to prevent the vehicle from moving as a result of the drag torques in the clutch arrangements. It is also conceivable that, for example, the brake system could close the brakes automatically upon transition of an operating element from N or P to D or R without the participation of the driver, so that, to this extent, it is again impossible for any uncontrolled acceleration of the vehicle to occur.

It can be provided that the blocking and/or positive coupling goes into effect when at least one positive condition is fulfilled and/or at least one negative condition is not fulfilled.

With respect to the blocking and release, the important point is whether or not the braking torque being applied by the brake system is sufficient in the first place to keep the vehicle stationary in spite of the drag torques (a controlled creeping could possibly be allowed). If the vehicle in question is equipped with an electrohydraulic brake (EHB), with an electromechanical brake (EMB), or with a conventional brake system with a braking assistant, the distance traveled by the pedal is usually measured either directly on the basis of the distance or the angle of the brake pedal or indirectly on the basis of the position of the diaphragm of the braking force amplifier or of the piston in the master brake cylinder, so that, to this extent, information concerning the braking torque being applied to the wheels is available. In the case of vehicles with an electronic stability program (ESP), the brake pressure is measured at least in both brake circuits (possibly also in the master brake cylinder), so that very accurate data on the braking torque are available. These data are to be exploited in connection with the inventive proposals pertaining to the actuation or nonactuation of the vehicle brake system; for example, they are to be processed by an appropriate control unit. In general, it is proposed that a/the control unit detect, measure, or estimate a braking torque acting on the vehicle wheels and that it implement the blocking or release on the basis of this braking torque and possibly also on the basis of a detected, measured, or predetermined clutch drag torque and/or clutch disk adhesion torque.

In regard to the above-discussed positive coupling, it is proposed that a/the control unit adjust the braking torque acting on the vehicle wheels to a certain value, preferably on the basis of a detected, measured, or predetermined clutch drag torque and/or clutch disk adhesion torque. This ensures that the adjusting braking torque is sufficient to keep the vehicle stationary and under control.

The control unit which brings about the blocking or release or which adjusts the braking torque can advantageously be designed to make available a vehicle creep function on the basis of the clutch drag torque and/or the clutch disk adhesion torque. According to this proposal, a creep torque acts on the driven wheels when the brake is released or when the driving mode is shifted to D or R. As a rule, however, it makes sense to make available a creep function of this type only when a creep function is also provided under normal conditions, that is, during normal driving, by a corresponding function.

According to a seventh primary aspect of the invention, it is proposed that a/the control unit be designed to adjust the braking torque acting on the vehicle wheels to a certain value by means of a vehicle brake system in such a way that, while the drive unit is running and the clutch arrangements are in principle disengaged, clutch drag torques and/or clutch disk adhesion torques acting on the vehicle wheels are compensated to zero or to a nominal value, and/or that a/the control unit be designed to use the clutch device to compensate to zero or to a nominal value the drive torque acting on the vehicle wheels while the drive unit is running, this drive torque being based essentially on the clutch drag torques and/or clutch disk adhesion torques present when the clutch arrangements are disengaged, this compensation being achieved by effectively actuating at least one of the two clutch arrangements in the engaging direction, the clutch arrangements being in the situation that a forward gear belonging to one of them and a reverse gear belonging to the other are engaged, for the purpose of increasing the torque transmitted by this clutch arrangement by a compensation value.

These proposals, which pertain primarily to starting off or to the situation immediately before starting off, are based on the possibility that, despite the actuation of, for example, a foot brake by the driver, the braking action thus achieved is very weak or at least too weak to prevent an unintentional acceleration or movement of the vehicle. For example, it is possible that only one or two braking controllers are provided on the brake pedal, which do not provide any information indicating the distance which the pedal has traveled and show only that the pedal has moved from the rest position. It would then be possible for the situation to occur that the braking torque is lower than the drag torque acting on the drive. In this case, the vehicle would move when the parking brake is released. This movement should be prevented, so that the driver always has complete control over the vehicle and thus can avoid dangerous situations. In cases where creep function is provided, that is, when the vehicle is allowed to move slowly at a fixed or adjustable speed after the driving gear is engaged (shift lever moved to D or R), the creep torque moving the vehicle should not exceed the creep torque predetermined by the control unit for creep function. From this it is clear why it is recommended that the torque which acts on the vehicle wheels should be adjustable. The braking torque can be taken properly into account very easily if the vehicle is equipped with a brake system based on more recent technology, as mentioned above. The data which can be provided by such a brake system concerning the exact position of the pedal and/or the brake pressure can be advantageously used to realize the inventive proposals already discussed above.

Thus, by means of effective intervention in, for example, the brake management system, the braking action of the wheel brakes can be increased so that either the desired vehicle acceleration (in the case of creep function, this would be equal to the intended creep acceleration) or no vehicle acceleration (or a vehicle acceleration of 0, if no creep function is present or is present but not activated) is achieved. If a vehicle hill-holder function is present, it is advisable to take into account the downhill force acting on the vehicle and accordingly to keep the resulting vehicle acceleration to 0 or at the creep value. In the case of a conventional hydraulic system with ABS/ESP, an electro-hydraulic brake (EHB), or an electromechanical brake (EMB), it would also be possible to set up the system so that the braking action can be influenced without the participation of the driver.

The controlled application of torque, especially compensating torque, directly to the clutch device is more advantageous than applying force to the brakes (which are subject to wear). Actuating the brakes, furthermore, is not necessarily possible or desirable in all types of vehicles, because it can distort the power train (which could cause vibrations to occur when the brakes are engaged and released). The second proposal is aimed at this controlled application of torque to the clutch device. If one forward gear and reverse gear are engaged, it is then possible to actuate the two clutch arrangements in a controlled manner in such a way that the transmitted torques work against each other, with the result that the torque which appears at the gearbox output shaft is reduced to 0 or to a desired torque value (creep torque):

$$M_{output} = M_{forward} - M_{reverse} = M_{creep}$$

or $$M_{output} = M_{forward} - M_{reverse} = 0$$

It is not the torques transmitted by the clutches which are important here but rather the torques acting on the gearbox power takeoff, these torques being the result of the torques acting on the two gearbox input shafts and the ratio of the engaged forward gear and the ratio of the engaged reverse gear. These torques, which are transformed as they pass from the gearbox input side to the gearbox output side, can be called "effective torques" and are, as mentioned, dependent on the engaged gear. A lower gear results in a higher effective torque on the gearbox output shaft than a higher gear does. Accordingly, the clutch with an effective output torque which is too low must be closed further until the output torque assumes the desired value, i.e., the desired compensating value.

In connection with the second proposal, according to which the two clutch arrangements work against each other in a certain sense, it is recommended that the control unit be designed to actuate the clutch arrangement in the engaging direction only to such an extent that the power loss occurring at the clutch arrangement as a result of friction does not exceed a certain maximum value. In the case of a very viscous operating fluid (very viscous oil), it can be that the pump arrangement (cooling oil pump) which is pumping the operating fluid may not be able to deliver a sufficient amount of operating fluid. If a displacement pump is used, the intake of the viscous operating fluid is a particular problem. If a swirl pump is used, both the intake and the delivery of very viscous fluids are problems. If the viscosity is so high that a sufficient amount of operating fluid cannot be made available, it is possible for damage to occur to the disks which carry linings when there is a large power loss as the vehicle starts to move. The maximum power loss allowed by the control unit should therefore be based on the maximum possible delivery rate of the operating fluid. This also applies in principle to all other driving conditions as well.

In this connection it is proposed in general that the control unit be designed to determine or to estimate the status of the clutch arrangement at the moment in question with respect to the supply of operating fluid and to use this supply status to determine the maximum value to be applied at that moment.

As already mentioned in the preceding explanation, the control unit can be advantageously designed to provide a vehicle creep function and/or—by taking the downhill forces acting on the vehicle into consideration for the sake of arriving at the compensation value—a vehicle hill-holder function. This function is provided on the basis of the clutch drag torque and/or clutch disk adhesion torque present at the moment in question.

The advantages which derive from engaging a forward gear and a reverse gear simultaneously have already been discussed. As a result, the vehicle can be moved in either direction, without the need to engage or disengage any gears.

According to an eighth primary aspect of the invention, a forward gear assigned to the one gearbox input shaft and a reverse gear assigned to the other gearbox input shaft can be engaged simultaneously, and the vehicle can be driven while these gears are simultaneously engaged, where, for driving in the forward direction, the clutch arrangement assigned to the one gearbox input shaft can be actuated to move in the engaging direction from a disengaged state and, for driving in reverse, the clutch arrangement assigned to the other gearbox input shaft can be actuated to move in the engaging direction from a disengaged state.

It is proposed as an elaboration that, for changing the direction of travel from forward to reverse, the clutch arrangement assigned to the one gearbox input shaft can be actuated to move in the disengaging direction and the clutch arrangement assigned to the other gearbox input shaft can be actuated to move in the engaging direction or, to change from reverse to forward, the clutch arrangement assigned to the other gearbox input shaft is actuated in the disengaging direction and the clutch arrangement assigned to the first gearbox input shaft is actuated in the engaging direction.

When one is driving forward in 2nd gear, for example, in a vehicle such as this, it is possible to reach velocities of more than 100 km/h. As a result of the high ratio of reverse gear, very high negative rpm's can occur in the associated clutch arrangement, which can possibly lead to the destruction of the clutch arrangement or to damage to the friction linings. In addition, an error in the actuation of the clutch could lead to the destruction of the gearbox. For these reasons, it is proposed as an elaboration that a velocity-limiting function be provided, which limits the vehicle's velocity to a certain maximum value when the vehicle is being driven with simultaneously engaged forward and reverse gears. For example, a velocity limit of 20 km/h could be provided. As a result of this type of limitation on the velocity of the vehicle, the problems explained above can be reliably avoided.

Another possibility for avoiding the problems indicated above is to be found in the automatic disengagement of reverse gear as soon as a certain driving velocity (in the forward direction) has been reached. For this purpose it is proposed specifically that a gear-disengage function be provided, which, when forward and reverse gears are engaged simultaneously while the vehicle is traveling forward, disengages the reverse gear when the vehicle's velocity exceeds a threshold value. This elaborative proposal is based on the idea that, as a rule, the drag torques are reduced to such an extent after a short period of operation that normal shifting becomes possible again, so that, for example, it is possible to shift to the next forward gear or back into reverse. It must be pointed out explicitly, however, that when the cooling oil is very cold and therefore highly viscous, it will under certain conditions not be possible to engage a new gear or to re-engage reverse gear on an idling gearbox input shaft.

It should also be pointed out in regard to the velocity-limiting function that no limit on the vehicle's velocity is required when reverse is (already) disengaged.

If we proceed on the basis of modern shifting elements or configurations of the shift lever, shifting between reverse (R) and forward (D) proceeds by way of the neutral (N) position, so that the forward or reverse gear will always be disengaged when a shift is made. This will not be desirable under certain conditions, however, if the driver wants to retain the ability to maneuver the vehicle both in forward and in reverse even at low temperatures. As already indicated, it might be possible to set up the system so that a disengage command is not issued when the shift lever passes through position N and that such a command is issued only when the shifting element is actually placed in position N and stays there for a certain minimum period of time. It is also possible to imagine that future shifting elements might work with a completely different arrangement. In any case, the idea of making it possible to drive forward when a reverse gear is engaged or to drive in reverse when a forward gear is engaged or to "activate" a forward gear and reverse gear alternately to drive the vehicle in the corresponding manner lies within the scope of the present invention.

Another important aspect pertains to the shifting of the gears after the vehicle has driven off. Because a vehicle is driven very seldom at extremely low temperatures, it is a completely reasonable solution to allow synchronizing forces at low temperatures which are greater than those normally allowed. As a result, the temperature of the operating fluid starting from which shifting is possible can be set at a lower value, which means that shifting can be allowed sooner after the engine has been started. The possibility of allowing higher synchronizing forces than normal has already been discussed above. In addition, the possibility was also discussed above of using several synchronizing devices to synchronize the gearbox input shaft in question. This proposal is applicable not only to the engagement of gears for starting off but also for the changing of gears during driving. When shifting, for example, from 2nd gear to 3rd gear, the synchronizing devices of 3rd and 5th gear can be used to brake the gearbox input shaft in question, it being assumed here that both gearbox input shafts are rotating at engine rpm's as a result of the high drag torques. In this case it is preferable to take reliable measures to prevent the engagement of an improper gear.

As a further possibility, it is proposed according to another aspect (the 9th primary aspect) of the invention, for a motor vehicle wherein the control unit also controls a preferably hydraulic actuating device, which is assigned or belongs to the clutch device in order to actuate the clutch arrangements in the engaging and disengaging directions; and wherein the control unit, in a power shift mode, is designed to actuate the clutch arrangements by means of the actuating device in opposite directions when the gearbox is in a state in which a starting gear assigned to the one gearbox input shaft is engaged and a target gear assigned to the other gearbox input shaft is engaged, in order to transfer the drive torque of the drive unit from the one to the other gearbox input shaft continuously and without interruption of the tractive force and thus to deactivate the starting gear as the torque-transmitting gear and to activate the target gear as the torque-transmitting gear, that an active synchronizing mode be provided, in which, for the deactivation of the starting gear as the torque-transmitting gear and the activation of the target gear as the torque-transmitting gear, first the starting gear is disengaged and/or the clutch arrangement assigned to the starting gear is opened; then the rpm's of the drive unit and/or the rpm's of the gearbox input shaft assigned to the target gear are brought to the synchronizing ratio of the target gear; and finally the target gear is engaged.

It is possible in this connection to provide that, in active synchronizing mode, the rpm's of the drive unit and the rpm's of the gearbox input shaft assigned to the target gear are brought jointly to the synchronizing ratio of the target gear by at least partially engaging the clutch assigned to the target gear while the rpm's of the drive unit are being brought to the synchronizing ratio. Another possibility in active synchronizing mode is to bring the rpm's of the gearbox input shaft assigned to the target gear to the synchronizing ratio by at least partially engaging the clutch arrangement assigned to the target gear after the rpm's of the drive unit have been brought to the synchronizing ratio.

The proposals offered above make it possible to shift the gears at low temperatures with the greatest possible protection or load-relief of the synchronizing devices as a result of the active synchronization achieved by means of the clutch device. It is possible to speak here of a "principle of active synchronization". As a result of the active synchronization according to the invention, it is true that it is no longer possible in the case of a power-shift gearbox to shift without any interruptions in the tractive force, but this will usually be acceptable during the period of time that that operating fluid (the cooling oil) is warming up.

According to the inventive proposal, when shifting from one gear (the starting gear) to the other gear (the target gear), first the starting gear is disengaged, so that there is no longer any positive engagement in the power train. In principle, however, it is also conceivable that the starting gear could remain engaged and that only the clutch arrangement assigned to the starting gear is opened. After that, the rpm's of the drive unit (the engine) will then be brought to the synchronizing ratio of the new gear. It is now possible (but not necessary) for the clutch arrangement assigned to the target gear to be opened and for the target gear to be engaged, without the synchronizing device of the target gear overloading the synchronization of the gearbox shaft in question. As a result of the drag torques, which can still be high under certain conditions, the behavior of the clutch arrangement even in the open state can resemble that of a closed clutch arrangement. An open clutch arrangement, however, increases the ease of shifting, so that it is preferred for the clutch arrangement of the target gear to be open before the target gear is engaged.

In regard to the matching of the drive unit rpm's to the synchronizing ratio of the target gear, however, it is preferred that this rpm matching occur in the engaged state of the clutch arrangement assigned to the target gear, so that the engine rpm's and the rpm's of the gearbox input shaft assigned to the target gear are brought to the proper value simultaneously. Ideally, the rpm's of the drive unit and the rpm's of the gearbox input shaft assigned to the target gear should be at least approximately the same.

As an elaboration it is proposed that, with respect to active synchronizing mode, upshifting be permitted only when an instantaneous vehicle velocity, based on the target gear, is equal to or greater than a minimum idling speed of the drive unit. According to this elaborative proposal, active synchronization can be used only when the vehicle is moving at sufficient speed. "Sufficient speed" means here that the velocity of the vehicle in the desired target gear, based on the gearbox input shafts, is greater than the lowest possible idling speed of the engine.

It is not absolutely necessary, however, to sacrifice the possibility of shifting without interruption in the tractive force at low temperatures and thus at high operating fluid viscosities.

According to another aspect (the 10th primary aspect) of the invention, it is proposed when a change is to be made from a higher starting gear to a lower target gear (downshifting), the control unit be designed to act on the drive unit in preparation for the engagement of the target gear in such a way as to increase its drive torque beyond the torque which can be transmitted by the clutch arrangement assigned to the starting gear, so that the rpm's of the drive unit increase beyond the rpm's at the moment in question of the gearbox input shaft assigned to the starting gear, at least approach a synchronizing rpm value for the target gear, which value depends on the velocity of the vehicle at the moment, and preferably reach this value at least approximately. With respect to upshifting, it is proposed for the vehicle either alternatively or in addition that, when a change is to be made from a lower starting gear to a higher target gear (upshifting), the control unit be designed, in preparation for the engagement of the target gear, to actuate the clutch arrangement assigned to the target gear, starting from a disengaged state, and to move it in the engaging direction until the gearbox input shaft which is assigned to the target gear and which up to now has been rotating by the action of the gearbox drag torques and/or braking torques at a maximum speed which is lower than the synchronizing rpm value for the target gear, is accelerated in the direction of an approach to the synchronizing rpm value and preferably reaches this value at least approximately.

As a way of preparing for the downshift, it is possible in accordance with the inventive proposal to increase the drive torque (engine torque) beyond the clutch torque of the clutch arrangement which is transmitting torque at the moment in question by intervening, for example, in the management of the drive unit, especially in the engine management system, so that the rpm's of the drive unit (engine rpm's) increase beyond the rpm's of the gearbox input shaft in question. In this way, the rpm's of the drive unit can be brought to the new synchronizing rpm value or at least brought close to it. At the same time that the rpm's of the drive unit are being increased or possibly thereafter, the clutch arrangement assigned to the target gear can then be closed in order also to bring the rpm's of the gearbox input shaft assigned to the target gear to the new synchronizing rpm value, which is determined by the actual speed of the vehicle and the target gear. Thus the new gear (target gear) can now be engaged without the need for the synchronizing device of the gearbox to perform a significant amount of friction work. It is sufficient for the clutch arrangement assigned to the target gear to be closed during the "speed-up" of the gearbox input shaft only to such an extent that the drag torques or clutch torques are sufficient to carry the gearbox input shaft along. The shifting sequence described above makes it possible to downshift without any interruption in the tractive force, even at low temperatures.

As already mentioned, the control unit can be advantageously designed to actuate the clutch arrangement assigned to the target gear in the engaging direction at the same time that the drive torque is increased or after it has been increased in order to accelerate the gearbox input shaft assigned to the target gear in the direction toward the synchronizing rpm value and preferably to bring it at least approximately to the synchronizing rpm value. In addition, in agreement with the explanatory discussions offered above, it is proposed that the control unit be designed to control the actuator arrangement, either during or after the increase in the drive torque and the acceleration of the gearbox input shaft assigned to the target gear, in such a way that this actuator arrangement, in preparation for the actuation of the clutch arrangements in opposite directions, acts on the gearbox in such a way as to engage the target gear.

In regard to upshifting, it should be pointed out that, during an upshift, the "new" gearbox input shaft synchronizing rpm level, that is, the synchronizing rpm value of the target gear, is below that of the starting gear. If the clutch arrangement assigned to the target gear is open, and if the drag torques of the gearbox are high enough that the rpm's of the gearbox input shaft assigned to the target gear are between 0 and the new synchronizing rpm value, it is possible, by closing the clutch arrangement assigned to the target gear, to bring the gearbox input shaft assigned to this gear to the new synchronizing rpm value in order to make possible or to facilitate the engagement of the gear. This type of shifting makes it possible to upshift without an interruption in the tractive force even at low temperatures. For this purpose, it is proposed in particular that the control unit be designed to control the actuator arrangement either during the acceleration of the gearbox input shaft assigned to the target gear or thereafter in such a way that this actuator arrangement, in preparation for the actuation of the clutch arrangements in opposite directions, acts on the gearbox in such a way as to engage the target gear.

Once the operating fluid, especially the cooling oil, has reached a sufficient temperature either as a result of warm-up measures, as a result of the warm-up of the internal combustion engine serving as the drive unit, or as a result of the driving of the vehicle, that is, once the drag torques associated with the viscosity of the operating fluid at low temperatures have decreased sufficiently, a control program, for example, can give the driver the freedom to shift and to operate the clutch normally and to engage any desired gear. It is proposed in particular that a/the control unit evaluate an actual temperature of the operating fluid, which is detected by a sensor arrangement and/or determined by the control unit, whereupon, as a function of this evaluation, a/the control unit releases or blocks normal shifting and clutch operation and allows a free choice of gears and/or shifting without interruption of the tractive force. It appears to be especially advisable to design the control unit in such a way that it allows normal shifting and clutch operation when the actual temperature exceeds a threshold value or when the viscosity of the operating fluid, determined from the actual temperature, has fallen below a threshold value.

Insofar as at least one temperature sensor or sensor arrangement is present to detect the temperature of the operating fluid, the sensor or sensor arrangement is preferably used to measure the operating fluid directly. For the case that no sensor of this type is available or for the case that supplemental data are desired (when, for example, greater security i.e., redundancy is desired), it is proposed that the control unit be designed to determine the actual temperature of the operating fluid on the basis of at least one temperature value determined by a sensor arrangement which does not measure the actual temperature directly and/or on the basis of at least one operating parameter of the power train. It is possible to use several temperature values or operating parameters recorded at different times and/or a mathematically defined temperature model or map, for example, as the basis of the determination.

A mathematical temperature model for determination of the temperature can be based, for example, on the fact that the oil temperature is a function of the outside temperature, of the engine temperature, of the quantity of oil, and of the frictional energy introduced into the clutch arrangements. This frictional energy is calculated as follows:

$$W_{friction}(t) \sim \int \Delta n(t) \times M_{clutch}(t) dt.$$

Here "$\Delta n$" stands for the slipping speed of a clutch arrangement, that is, the difference between the clutch input rpm's and the clutch output rpm's of the clutch arrangement in question; and $M_{clutch}$ stands for the torque transmitted by the clutch arrangement. In the case of the double clutch device, which can be referred to simply as a double clutch, the frictional energies of the two clutch arrangements are additive.

The influence of the outside temperature, of the engine temperature, and of other factors is usually very strongly dependent on the designs of the clutch device, gearbox, and engine and also on the nature of the materials used, the installation space, etc. It is therefore impossible to give a universal model independent of the vehicle; instead, an appropriate model must be set up for each type of vehicle.

During normal driving without pronounced acceleration or without the need to start off while pulling a heavy load (such as starting off while towing a trailer), the operating fluid (the cooling oil) usually warms up relatively slowly. This means that the drag torques occurring in the clutch arrangements also decrease comparatively slowly. It can therefore be imagined that the drag torques will not reach values which allow normal synchronization without overloading or damaging the synchronizing devices until after two-to-three minutes of driving. An advantageous way of reducing the warm-up period in any case is to keep the quantity of operating fluid (the quantity of cooling oil) as small as absolutely necessary. In this context, the measures and designs of a clutch system proposed in German Patent Application No. 101 18 756.4 (Filing Date of the Application: Apr. 17, 2001) can be put to advantageous use. It should also be remembered that the drag torque which occurs is strongly dependent on the quantity of operating fluid (quantity of cooling oil) being supplied at the moment in question. This is an argument in favor of supplying only small amounts of operating fluid. At the same time, however, it is also necessary to ensure the necessary cooling. A compromise will be sought and found between the necessary cooling and the lowest possible drag torques.

One possibility of shortening the warm-up time is to provide effective heating by introducing lost power into the clutch device. This can be done, for example, by simultaneously actuating both clutch arrangements so that some of the power of the drive unit (engine power) is converted into heat in the clutch device. Reference is made in this regard to German Patent Application No. 101 28 856.5 (Filing Date of the Application: Jun. 15, 2001), the disclosure of which is included in the disclosure of the present application.

Another possible way to reduce the drag torque is to reduce or to stop completely the supply of operating fluid when no cooling or lubrication of the disks is required. This leads to an immediate reduction of the drag torques, because they are caused by the operating fluid (cooling oil) present between the disks. According to another aspect (11th primary aspect), it is proposed for a motor vehicle wherein the clutch arrangements are designed as multi-disk clutch arrangements, to which an operating fluid, especially a cooling oil, can be supplied by a pump arrangement for operation under the effect of the operating fluid; specifically that the pump arrangement or a flow-adjusting device be controlled by a control unit in such a way as to stop the instantaneous flow of operating fluid to the disk clutch arrangements, and that the control unit be designed to increase and to decrease the flow of operating fluid to at least one of the clutch arrangements as a function of the instantaneous demand for operating medium, in that the control unit decreases or stops the flow of operating fluid when the demand is low and increases the flow of operating fluid when the demand is high.

While the drive unit is running, the operating fluid is spun away from the disks of the unactuated clutch arrangement by centrifugal force. This results in a significant reduction in the drag torque. It is possible that, as a result of this measure, the drag torques could be reduced to such an extent that gears could be engaged on the gearbox input shaft in question. It would be reasonable to assume that, after starting off in 2nd gear, for example, the clutch arrangement not used for starting, i.e., the clutch arrangement assigned to the still-engaged reverse gear, could be spun quickly free and thus prepared for shifting to the next forward gear. This shifting can then be usually accomplished normally and without excessive load on the synchronizing device of the gearbox, and it is then no longer necessary to expect the driver to remember to limit the velocity of the vehicle for safety reasons (because of the still-engaged reverse gear).

It is proposed as an elaboration that the control unit determine the fluid supply demand in view of the power loss occurring in the clutch arrangement and/or in view of the demand for lubricant at the disks of the clutch arrangement. As a result, adequate cooling and lubrication will always be ensured.

According to another aspect (12th primary aspect), it is proposed specifically that the pump arrangement or the flow-adjusting device and/or a pump arrangement assigned to a hydraulic actuating device for the clutch arrangements can be operated in a circulating mode, in which thermal energy is introduced into the operating medium by the circulation of the operating fluid independently of the demand of the clutch arrangements for operating medium and independently of the actuation of the clutch device. This inventive proposal is based on the fact that energy can be introduced into a fluid by circulating it, with the result that the fluid warms up. According to the inventive proposal, therefore, the pump arrangement or flow-adjusting device in question is operated in circulation mode to circulate the operating fluid and thus to heat it, as a result of which the drag torques are reduced. A bypass is preferably provided, which can be opened to allow the operating medium to pass around the clutch arrangements, so that the drag torques are not increased by the circulation itself.

In elaboration of the above, it is proposed that a control unit be designed to respond to an event indicating that the motor vehicle is about to be started by initiating the circulation mode. For example, when an electric cooling oil/hydraulic oil pump is used, the "warm-up process" according to the invention can be initiated as soon as the driver opens the vehicle by remote control and/or opens the driver-side door. To save electrical energy (and thus, for example, to make sure that the internal combustion engine can be started), it is also possible for the circulation mode to be initiated only after the internal combustion engine is running.

It is proposed in general that a/the control unit be designed automatically to initiate the circulation mode when at least one positive condition is fulfilled and/or at least one negative condition is not fulfilled. It is also proposed in general that a/the control unit be designed to automatically terminate circulation mode when at least one positive condition is fulfilled and/or at least one negative condition is not fulfilled.

With respect to low-temperature operation, it can be readily imagined that, depending on the design of the motor vehicle, driving off should be allowed only after the operating fluid (the oil) has reached a sufficiently high temperature or only after its viscosity has decreased sufficiently to allow proper shifting. It is proposed in particular that a/the control unit be designed to release or to block the starting of the drive unit as a function of the viscosity of the operating medium at the moment in question.

This proposal is of general interest and therefore pertains not only to the warming-up of the operating fluid by circulation but also specifically to any other possibility of warming up the operating fluid before the vehicle starts to drive off.

According to another aspect (13th primary aspect) of the invention, it is therefore proposed that a control unit be designed to release or to block the starting of the drive unit as a function of the viscosity of the operating medium at the moment in question.

In general, the heating of the operating fluid by appropriate operation of the clutch device appears to be of particular interest. For this purpose, it can be provided that a/the control unit is designed to actuate the clutch arrangements by means of a preferably hydraulic actuating device and to operate in a warm-up mode at least one, preferably both, clutch arrangements with slip. Reference is made here again to the disclosure of German Patent Application No. 101 28856.6 (Filing Date of the Application: Jun. 15, 2001).

In this regard, the specific idea here is that the control unit is designed to allow the minimum of one clutch arrangement to work with slip while the vehicle is stationary, this work thus being performed in opposition to the braking action of a brake device, and/or to operate the minimum of one clutch arrangement with slip while the vehicle is moving. Allowing a clutch arrangement or the clutch arrangements to slip against the action of a brake device with an engaged gear should preferably occur in a high gear, because here a relatively low drive torque is acting on the wheels, and the brake is thus required to apply only a relatively small amount of moment (braking torque) in order to keep the vehicle stationary or to adjust the resulting driving torque to the desired value.

In relationship with all of the inventive proposals and also independently thereof, it is useful to take preparatory and supportive measures to prepare for the parking of the vehicle and/or for the engagement of gears in such a way that the drag torque problem is at least made less severe and also to facilitate or support the breaking-loose of the disks, that is, the overcoming of the adhesion torque, by means of effective measures.

Thus, to prepare the vehicle for parking, it is proposed in particular that a pump arrangement or a flow-adjusting device be controlled by a/the control unit in order to adjust the instantaneous flow of operating fluid to the disk clutch arrangements, and that the control unit be designed to increase the flow of operating fluid for a predetermined time period in preparation for the parking of the vehicle or during the parking of the vehicle while the clutch arrangements are open so that the operating fluid can push the disks of the clutch arrangements apart. According to this elaborate proposal, the flow of operating fluid, especially the flow of cooling oil being supplied to the clutch arrangements to cool them, is temporarily increased significantly, so that this flow of fluid can push the disks away from each other while the clutch arrangement is open. This measure can be applied advantageously both when the vehicle is parked with engaged gears and also when the vehicle is parked with disengaged gears and is of general interest.

Accordingly, it is proposed according to another independent aspect (the 14th primary aspect) of the invention that the pump arrangement or flow-adjusting device be controlled by a control unit to adjust the instantaneous flow of operating fluid to the disk clutch arrangements, and that the control unit be designed to recognize when the vehicle is about to be parked or is being parked and, in preparation for parking or during parking, to increase the flow of operating fluid for a predetermined time interval with disengaged clutch arrangements so that the flow of operating fluid can push the disks of the clutch arrangements apart.

The control unit is preferably designed to increase the flow of operating fluid as needed when at least one positive condition is fulfilled and/or at least one negative condition is not fulfilled.

Another advantageous measure is to bring the drive unit up briefly to a comparatively high speed (e.g., >2,000 rpm) before the vehicle is parked in order make use of the increased centrifugal forces to spin the operating fluid (the cooling oil) out of the clutch arrangements. It is proposed in particular that a/the control unit be designed to operate the drive unit at a speed significantly faster than idling speed for a predetermined time period with the clutch arrangements disengaged to prepare for parking and/or during the parking of the vehicle by making use of the effect of centrifugal force to remove operating fluid from the disks of the clutch arrangements.

This proposal is advantageous both in connection with the parking of the motor vehicle with engaged gears and also in connection with the parking of the vehicle with disengaged gears, and is also of general interest.

Accordingly, it is proposed according to another aspect (15th primary aspect) of the invention that the pump arrangement or flow-adjusting device be controlled by a control unit to adjust the instantaneous flow of operating fluid to the disk clutch arrangements, and that a control unit assigned to the drive unit be designed to recognize when the vehicle is about to be parked or is being parked and, in preparation for parking or during parking, to operate the drive unit at a speed significantly faster than idling speed for a predetermined time period with disengaged clutch arrangements to remove the operating fluid from the disks of the clutch arrangements by the effect of centrifugal force.

So that the clutch arrangements can be effectively spun free of operating fluid, the control unit can be advantageously designed first to stop the supply of operating fluid to the clutch arrangements and then to operate the drive unit at a speed significantly faster than the idling speed for a predetermined time period.

In addition, the control unit can be advantageously designed to operate the drive unit, as needed, at a speed significantly faster than the idling speed when at least one positive condition is fulfilled and/or at least one negative condition is not fulfilled.

To prepare for or to facilitate the engagement of a gear, it is proposed that a/the control unit be designed to operate the drive unit at a speed significantly faster than the idling speed for a predetermined time period to prepare for the engagement of at least one gear and/or during the engagement of the minimum of one gear while at least one clutch arrangement is disengaged and/or when no more than one gear is engaged to remove operating fluid from the disks of the clutch arrangements by the effect of centrifugal force. Thus, after the engine has been started, it is possible to facilitate the engagement of the gear—in the situation that no gear is or has been engaged—by increasing the engine rpm's in order to use the effect of the now increased centrifugal force acting on the operating fluid (the cooling oil) to spin free the set or sets of disks and thus to reduce the drag torques, which makes it easier to engage the gear. This inventive proposal is also of general interest.

Accordingly, it is proposed according to another aspect (16th primary aspect) of the invention that a control unit assigned to the drive unit be designed to recognize when the minimum of one gear is about to be engaged or when the minimum of one gear is being engaged and, in preparation for the engagement and/or during the engagement, to operate the drive unit at a speed significantly faster than the idling speed for a predetermined time interval while at least one clutch arrangement is disengaged and/or no more than one gear is engaged to remove operating fluid from the disks of the clutch arrangements by the effect of centrifugal force.

The idea here, in particular, is to operate the drive unit at a speed significantly faster than idling speed while the clutch arrangements are disengaged and/or while no gear is engaged.

It is proposed by way of elaboration that the control unit be designed first to interrupt the supply of operating fluid to the clutch arrangements and then to operate the drive unit at a speed significantly faster than idling speed for the predetermined time period. The control unit can be advantageously designed to operate the drive unit, as needed, at the speed significantly faster than idling speed when at least one positive condition is fulfilled and/or at least one negative condition is not fulfilled.

To make it easier to break the disks loose, it is proposed that a/the control unit be designed, in preparation for the engagement of a gear, regardless of whether the drive unit is running or not running, to command a preferably hydraulic actuating device to actuate the clutch arrangements at least once, preferably several times in succession in the engaging and disengaging directions in order to achieve or at least to facilitate the separation of the disks from each other, which are adhering to each other as a result of the presence of the operating fluid, by the mechanical distortion of the clutch arrangements and/or the displacement of the disks. It has been found that, in the case of hydraulically actuated clutch arrangements with hydraulic slave cylinders integrated into the clutch device, for example, the clutch arrangements can be distorted by actuating the pistons of the two clutch arrangements several times, as a result of which the disks are slightly displaced. The way in which the clutch arrangements are actuated, however, ultimately plays no role in connection with the current proposal. The actuation of the clutch arrangements can advantageously be accomplished either when the engine is running or when it is not. This type actuation is sufficient in itself to break the disks loose. The actuation can be conducted before the engine is started both in the case of a vehicle which has been parked with engaged gears and also in the case of a vehicle which has been parked with disengaged gears. The actuation can also be conducted, if necessary, after the engine has been started. The proposal is also of interest independently of the other aspects of the invention.

Accordingly, it is proposed according to another aspect (17th primary aspect) of the invention that the control unit be designed to actuate the clutch arrangements by means of an actuating device at least once, preferably several times in succession, in the engaging and disengaging directions to prepare for the engagement of a gear, regardless of whether the drive unit is running or not running, to achieve, or at least to assist, the loosening of the disks from each other, which are adhering to each other as a result of the presence of the operating fluid, by the mechanical distortion of the clutch arrangements and/or the displacement of the disks.

The control unit can be designed to actuate the clutch arrangements in the engaging and disengaging directions for the purpose of loosening the disks from each other as needed when at least one positive condition is fulfilled and/or at least one negative condition is not fulfilled.

The loosening of the disks from each other can also be achieved or at least assisted in that, while the drive unit is running, vibrations are intentionally introduced into the clutch device. For this purpose, it is proposed in particular that a/the control unit be designed effectively to generate rotational irregularities or speed irregularities in the power train, especially to generate rotational vibrations which act on the clutch device, by appropriate control of the running drive unit in order to achieve, or at least to assist, the loosening of the disks from each other, which are adhering to each other as a result of the presence of the operating fluid. It is especially advantageous for these rotational irregularities, especially vibrations, to be in the range of the natural frequencies of the clutch arrangements and/or of the disks, so that, as it were, the effect is aimed specifically at the adhering disks. This elaborative proposal is also of general interest.

Accordingly, it is proposed according to another aspect (18th primary aspect) of the invention for a motor vehicle, that a control unit assigned to the drive unit be designed effectively to generate speed irregularities in the power train, especially rotational vibrations, by appropriate actuation of the running drive unit, to achieve, or at least to assist, the separation of the disks from each other, which are adhering to each other as a result of the presence of the operating fluid.

The control unit can be designed to use the drive unit to generate the speed irregularities acting on the clutch device, if necessary, when at least one positive condition is fulfilled and/or at least one negative condition is not fulfilled.

In the case of a drive unit designed as an internal combustion engine, the control unit can be designed to generate the speed irregularities acting on the clutch device by turning cylinders off and/or by supplying the cylinders with fuel in an irregular and/or alternating manner. The intentionally introduced vibrations can therefore be achieved by turning off cylinders, for example; the same cylinders can be turned off each time, or different cylinders can be turned off in alternation. The cylinders, furthermore, can be supplied with different amounts of fuel in order to generate the intentional speed irregularities.

The invention also pertains to a motor vehicle power train, possibly with an assigned control unit, for a motor vehicle according to the invention, where the power train and/or the control unit is designed in accordance with at least one aspect of the invention as explained above.

The invention also pertains to a multiple clutch device, especially to a double clutch device, possibly with an assigned control unit, for the motor vehicle according to the invention, where the multi-clutch device and/or the control unit is designed in accordance with at least one aspect of the invention as explained above.

The invention also pertains to a motor vehicle gearbox, especially to a power-shift gearbox, possibly with an assigned control unit, for a motor vehicle according to the invention, where the gearbox (possibly a double-clutch or power-shift gearbox) and/or the control unit is designed in accordance with at least one of the aspects explained above.

The invention also pertains to a process for operating a motor vehicle and/or a power train and/or a multi-clutch device and/or a gearbox according to the invention in such a way that problems associated with drag torques, which occur at low temperatures in the clutch device designed as a disk clutch device, are solved or at least made significantly less severe. The process is preferably designed as a control method for the control unit of a motor vehicle according to the invention or of a motor vehicle power train according to the invention or of a multi-clutch device according to the invention or of a motor vehicle gearbox according to the invention.

The invention is explained in greater detail below on the basis of exemplary embodiments, which either present various inventive proposals according to the various aspects of the invention directly on the basis of examples or which present various inventive proposals according to the various aspects of the invention which can be realized by the expert without significant effort, i.e., by the routine application of his professional knowledge (such as, for example, by the appropriate programming of a microprocessor-based electronic control unit assigned to the gearbox and/or to the clutch device and/or to the drive unit of the power train), without the need for any inventive activity as such.

BRIEF DESCRIPTION OF THE DRAWINGS

FIG. 1(a) shows a schematic exemplary diagram, which illustrates a basic design of a clutch system according to the invention with a wet-running double clutch, and FIG. 1(b) shows a schematic diagram of a motor vehicle power train according to the invention together with its associated control unit and the associated actuating devices, which actuate the drive unit, the double clutch, and the power-shift gearbox;

FIG. 2 show a first exemplary embodiment of a clutch system according to the invention;

DETAILED DESCRIPTION OF THE PRESENTLY PREFERRED EMBODIMENTS

Figure 3:
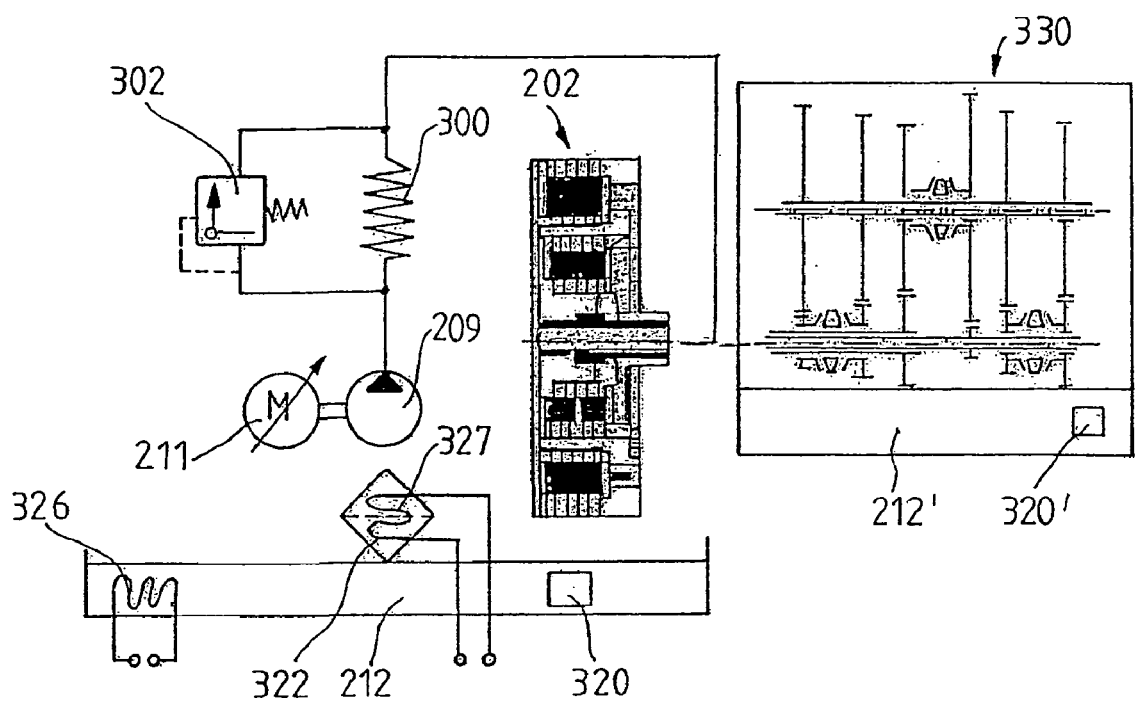
FIG. 3 shows the clutch system of FIG. 2 in combination with an associated gearbox.

FIG. 1(a) shows a schematic diagram of a clutch system 200, which has a wet-running double-clutch 202 with a first, radially outer clutch arrangement 206 and a second, radially inner clutch arrangement 204. Clutch arrangements 204 and 206 are wet-running clutch arrangements, such as wet-running disk clutch arrangements, each of which has at least one set of disks, which, in the present exemplary embodiment, are arranged radially, one outside the other, and each of which is actuated by an associated actuating piston of a hydraulic slave cylinder integrated into the double clutch. Examples of these types of double clutches are disclosed in, for example, DE 100 04 179 A1 as well as in other Offenlegungsschriften and patent applications of the present applicant.

The clutch system 200 has two independent pumps, namely, a first pump 208 and a second pump 209, each of which is preferably driven by its own electric motor 210, 211, respectively. The first pump 208 provides pressure medium, especially hydraulic oil, at a comparatively high pressure, which is sufficient to actuate the clutch arrangements 204 and 206 of the double clutch 202. For the selective actuation of the clutch arrangements, these arrangements or more accurately their hydraulic slave cylinders are each connected by an associated valve 214, 216 to the pump 208. The pump draws pressure medium from a reservoir 212.

The second pump 209 provides a comparatively high volume flow rate of coolant, especially cooling oil, which serves to cool the clutch arrangements 204 and 206. The pump 209 draws the coolant, possibly oil, from a reservoir 222. It should be mentioned that it is not mandatory that the reservoir 222 be separate from the reservoir 212.

So that, at low temperatures, the cooling oil can be brought up to operating temperature more quickly, switching valves 230, 232 are provided, one on the delivery side of the pump 208, the other on the delivery side of the pump 209. By means of these valves, a bypass line to the storage reservoir 222 can be opened to allow the operating medium or pressure medium to bypass the clutch device (double clutch) 202, as a result of which heat is introduced into the oil and its temperature is raised. The warm-up time until the operating temperature is reached can thus be significantly reduced, and accordingly a state can be reached relatively quickly in which there are no more interfering drag torques in the clutch arrangements 204 and 206 caused by the excessive viscosity associated with low temperatures.

FIG. 1(b) shows a motor vehicle power train according to the invention with the double clutch 202; an actuating device 234 (of the type shown in FIG. 2, comprising the control valves 214 and 216), assigned to the clutch; a power-shift gearbox 330 with two coaxial gearbox input shafts, which can be actuated automatically by an actuating device 236; and a drive unit 238, designed as an internal combustion engine. The components cited above can be controlled by a control device 316, which can be referred to as the ECU and/or the TCU, which acts either directly or via the actuating devices assigned in each case to the components. The control device 316, which can also be called a control unit, can consist of several intercommunicating sub-control units and receive signals from various sensors and actuating elements, such as from a shift lever 452, which, for example, has the shift positions P (Park), R (Reverse), N (Neutral), and D (Drive Forward), and from a brake pedal 450. A brake system of the vehicle, which is controlled by the control unit, is designated 454 in FIG. 1(b), and a starter, which can be actuated by the control unit, is designated 456 in FIG. 1(b).

In regard to the double clutch, it should also be pointed out that this can embody one of the designs disclosed in, for example, DE 100 04 179 A1.

FIG. 2 shows more of the details of an exemplary embodiment of a clutch system according to the invention with the basic design shown in FIG. 1.

According to FIG. 2, the cooling oil is supplied to the double clutch 202 via a heat exchanger 300, because it is possible for the temperature of the oil in the oil sump 212 to increase considerably when; for example, the clutch is slipping for a prolonged time. The heat exchanger 300 keeps the oil temperature at a temperature level sufficient for the cooling of the double clutch. The cooling oil can become highly viscous at low temperatures, and thus under certain conditions not enough cooling oil will be able to reach the double clutch. It is also possible for the flow resistance of the heat exchanger 300 at very low temperatures to cause the oil pressure to become high enough to cause damage. For this reason, a bypass valve 302 is provided, which can be preloaded by a spring, for example, and which, when the cooling oil pressure downstream from the oil cooler 300 exceeds a predetermined pressure threshold, opens and allows the cooling oil to bypass the oil cooler 300 and to proceed directly to the double clutch.

In the exemplary embodiment of FIG. 2, a hydraulic oil reservoir 304, which is under the pressure of a gas cushion, is installed in the clutch actuation hydraulic oil circuit; this reservoir is filled by the pump 208 via a nonreturn valve 306 and is connected via the valve 214 and the valve 216 to the actuating slave cylinders of the two clutch arrangements 204 and 206. The hydraulic oil reservoir 304 provides a uniform pressure level, which is especially advisable when the pump 208 is designed as a piston pump, and makes it possible for the pump 208 to be a pump with a very small delivery volume. The volume of oil delivered per unit time by the pump 208b can therefore be smaller than the hydraulic oil volume required per unit time during the actuation of the clutch.

The hydraulic oil circuit between the nonreturn valve 306 and the valves 214 and 216 is protected by a pressure-limiting valve 308 from excessive pressures of the hydraulic oil, which could lead to damage. The pressure in this hydraulic oil circuit, which is determined by the level of the oil in the reservoir 304, is detected by a pressure sensor 310. A pressure sensor arrangement, such as pressure sensors 311 and 313 for each valve, furthermore, can be assigned to the delivery sides of the valves 214, 216; these sensors detect the hydraulic pressures which are present beyond the valves and which act on the hydraulic slave cylinders.

Another pressure-limiting valve 312 has the job of preventing the pressures beyond the valves 214 and 216 acting on the hydraulic slave cylinders of the clutch devices from exceeding a maximum value, again to prevent damage. The two nonreturn valves 314, 316 are provided to make it possible for only one pressure-limiting valve to monitor the actuating pressure of both hydraulic slave cylinders.

To guarantee effective adjustability/controllability of the clutch actuation process, a hydraulic damper 307, 309 (comprising, for example, a spring-loaded piston, a metal bellows spring, etc.) can be connected in parallel with each of the two hydraulic slave cylinders of the clutch devices 204, 206. These hydraulic dampers damp pressure peaks in the hydraulic system.

In cases where, at low temperatures, that is, at high viscosities of the oil, the pressure of the cooling oil is insufficient to cool the clutch, perhaps because the hydrodynamic pump serving as the pump 209 cannot generate enough pressure, a valve 315 is provided in the arrangement according to FIG. 2. This valve makes it possible to branch a small stream of the hydraulic oil from the stream provided by the pump 208 in order to provide a kind of "emergency cooling" of the clutch arrangements, when this proves necessary. Because the high viscosity of the cooling oil making it necessary to open valve 315 occurs only at low temperatures, at which, in any case, there is only a relatively small need for the cooling of the double clutch, a relatively small "emergency cooling oil stream" is sufficient. This "emergency cooling", furthermore, is required only until the temperature of the oil and thus the viscosity of the oil are sufficient to ensure sufficient output from the cooling oil pump 209. Instead of a valve 315, it would also be possible to use a so-called diaphragm, throttle, or the like, through which a small stream can be branched continuously from the hydraulic oil stream provided by the pump 208 and thus introduced into the cooling oil circuit. If the valve 315 which branches off the cooling oil only when needed is used, the pump 208 can possibly also be operated in overload mode for brief periods of time in order to provide sufficient cooling oil in the short period of time until the oil has been heated sufficiently. Because the periods of time when this is required are usually very short, the service life of the pump 208 will not be significantly affected. In order to ensure, independently of the operating state of the pump 209, that the oil delivered by the pressure pump 208 to the cooling circuit does not flow back to the oil sump 212, a nonreturn valve 317 can be connected in series with the pump 209, preferably downline from it.

The bypass valve 232 is also provided in the example according to FIG. 2, so that a bypass mode, in which the pump 209 circulates the cooling oil past the double clutch 202, can be activated at low temperatures. The valve can also be designed so that some of the cooling oil stream provided by the pump 209 is sent to the double clutch 202, whereas the rest is returned via the bypass line to the oil sump 212. Thus at least limited operation of the clutch, i.e., limited driving of the motor vehicle equipped with the power train, is possible even in this circulation mode.

FIG. 2 also shows an electronic control unit ECU (reference no. 316), which actuates the open-loop/closed-loop control valves 214, 216 as a function of the command variable in question. It is also possible for the control unit to receive measurement values from various sensors such as from the pressure sensor 310 and other pressure sensors (possibly including sensors 311 and 313) and from temperature-sensing devices or sensors. The idea here is in particular to use one or more temperature sensors to detect the temperature of the clutch cooling oil circuit (pump 209, cooler 300 or bypass valve 302, clutch device 202, sump 212). A corresponding sensor 320, which is installed, for example, in the clutch oil sump 212 and which detects the temperature of the oil circulating in the circuit or present in the sump, is illustrated schematically. On the basis of, for example, the temperature signal detected by the sensor 320, the electronic control unit can also control, in an open-loop or closed-loop manner, the delivery volume per unit time by the pump 209 and/or the volume flow rate let through by a volume flow rate adjusting valve (not shown), which is also installed in the circuit. In this way, the temperature balance of the clutch device 202 or of the clutch cooling oil circuit can be influenced. By adjusting the circulation rate in the coolant circuit, an influence can be exerted on the cooling rate in the cooler 300 (a higher or lower $\Delta T$ at the cooler), and advantage can be taken of turbulent flow states or laminar flow states.

For the sake of completeness, it should also be mentioned that the components designated 322 and 324 in FIG. 2 are oil filters. Alternatively or in addition, oil filters can also be provided on the delivery side of the pumps 208, 209. It is obvious that the electronic control unit 216 actuates not only the open-loop/closed-loop control valves 214 and 216 but also the valves 232 and 315, depending on the situation.

To bring the cooling oil and thus the clutch device or the double clutch 202 to operating temperatures after the motor vehicle has been started, especially when the oil is at a low temperature, and in particular to reduce the viscosity of the cooling oil quickly to the point that the system is fully functional, an electric oil-heating arrangement can be provided, which, for example, can have at least one heating element 326 in the oil sump 212 and/or at least one heating element 327 integrated into the intake line of the pump 209, e.g., into the filter 322. At least one heating element can also be integrated into the intake line of the pump 208, e.g., into the filter 324. As heating elements, heating plates with an approximate size of 30 mm×50 mm can be used, which have a type of heating coil on the surface and which can put out, for example, a heating power of approximately 300 W. Other types of heating elements, such those in the form of the glow plugs used in diesel engines can also be employed. Another possibility is to provide a thermal energy storage arrangement such as a so-called PCM device.

By integrating at least one heating element into an intake channel of the cooling oil pump 209 and/or of the hydraulic oil pump 208, the oil actually pumped can be heated without the need to heat the entire volume of oil. Electrical energy is therefore conserved. It can also be guaranteed that only preheated oil is pumped by the pump in question.

Figure 4:
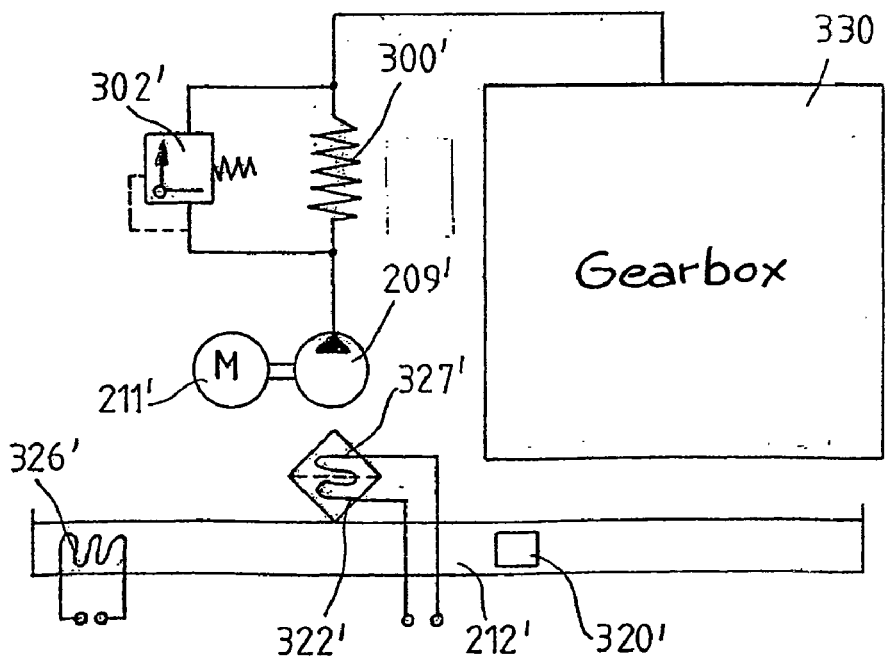
FIG. 4 shows a possible design of a cooling oil circuit for the gearbox of FIG. 3.

FIG. 3 shows the clutch system of FIG. 2 (not all components are shown) in combination with a double-clutch gearbox 330. The preferably automated gearbox 330 can have its own cooling oil circuit, separate from the cooling oil circuit of the clutch device 202, of the type shown by way of example in FIG. 4. An oil pump 209', driven by a motor 211', draws cooling oil from a reservoir (the gearbox sump) 212'. The transported cooling oil is usually sent by way of a cooler 300' to the components of the gearbox 330 to be cooled. To avoid excessive pressures in the cooling oil circuit at low temperatures, a pressure-actuated bypass valve 302', for example, is provided, which, when a pressure threshold is exceeded, opens a bypass line passing around the cooler 300'. The gearbox cooling oil circuit is to this extent the same as the clutch cooling oil circuit according to FIGS. 2 and 3. The cooler 300' with the bypass line can, as shown in FIG. 4, be located between the pump 209' and the gearbox (possibly an automated gearbox) 330. It is also conceivable, however, that the cooler and the bypass circuit could be installed downstream from the gearbox or automatic gearbox. A temperature sensor 320', which measures the temperature of the circulating cooling oil and sends corresponding measurement values to, for example, the electronic control unit ECU of FIG. 2, can be assigned to the gearbox cooling oil circuit. According to FIGS. 3 and 4, the temperature sensor 320' is installed in the gearbox sump 212'.

In contrast to the designs explained above according to FIGS. 3 and 4, it is also possible to provide a common cooling oil circuit or a circuit consisting of parts which can be connected together depending on the situation as proposed in German Patent Application No. 101 18 756.4, filed on Apr. 17, 2001, to serve both the double clutch and the gearbox. The disclosure of this patent application is included by reference in its entirety in the disclosure of the present application.

Instead of the pressure-actuated bypass valve 302 in the case of the clutch cooling oil circuit or the bypass valve 302' in the case of the gearbox cooling oil circuit, an electrically actuatable switching valve, such as 3-2-port directional control valve, can be provided in order to open a bypass line passing around the cooler 300 or to close it again when needed or in accordance with a heat-management strategy (such as for the effective achievement and maintenance of a nominal operating temperature), so that the cooling oil can be allowed to bypass the cooler 300 or 300' and arrive directly at the double clutch 202 or at the gearbox components to be cooled.

After the motor vehicle has been started, the double clutch 202 can advantageously be operated with defined slip when the outside temperatures are low, for example, in order to heat the cooling oil up to operating temperature as quickly as possible. The cooling oil is heated by the friction which occurs between the disks during operation in slip mode. To prevent the set of disks of the double clutch in question from overheating and to achieve the desired heating of the cooling oil as quickly as possible, a stream of cooling oil, provided by the pump 209, for example, should be flowing continuously during operation in slip mode. For the details of this type of slip mode operation, which can occur both when the vehicle is stationary and when it is moving, reference is made to the content of the German Patent Application No. 101-28 856.5, filed on Jun. 15, 2001. The disclosure content of this older German patent application is included by reference in its entirety in the disclosure of the present application.

The viscosity of the cooling oil being used can become very high, especially in a vehicle which has been parked out of doors at low outside temperatures, for example. Such high viscosities can cause considerable problems. As a result of the increase in the viscosity of the oil which occurs at low temperatures (at oil temperatures of, for example, below 0° C.), very high drag torques can occur in the disk clutch arrangements (up to as much as 25 Nm or more), in comparison with the drag torques of, for example, less than 2 Nm, which occur at normal operating temperature (approximately 90° C.). In addition, break-loose or separation torques of more than 50 Nm can occur as a result of the oil between the disks, which makes the disks stick to each other. As a result of these high drag or break-loose torques, it can become impossible in practice to engage a gear, because conventional synchronizing devices in the gearbox are not designed to overcome torques of such magnitude. If no gears can be engaged or if it is impossible to shift gears, the motor vehicle cannot be moved.

Figure 5A:
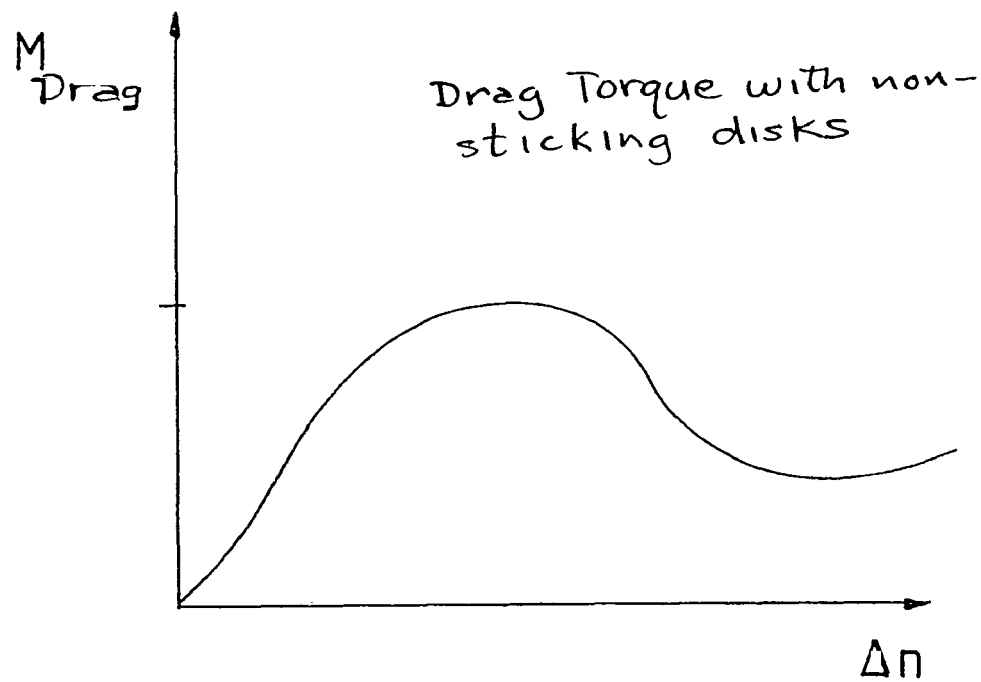
FIG. 5(a) shows a diagram of the typical way in which the drag torque occurring in a disk clutch arrangement depends on the differential speed at low temperatures.
Figure 5B:
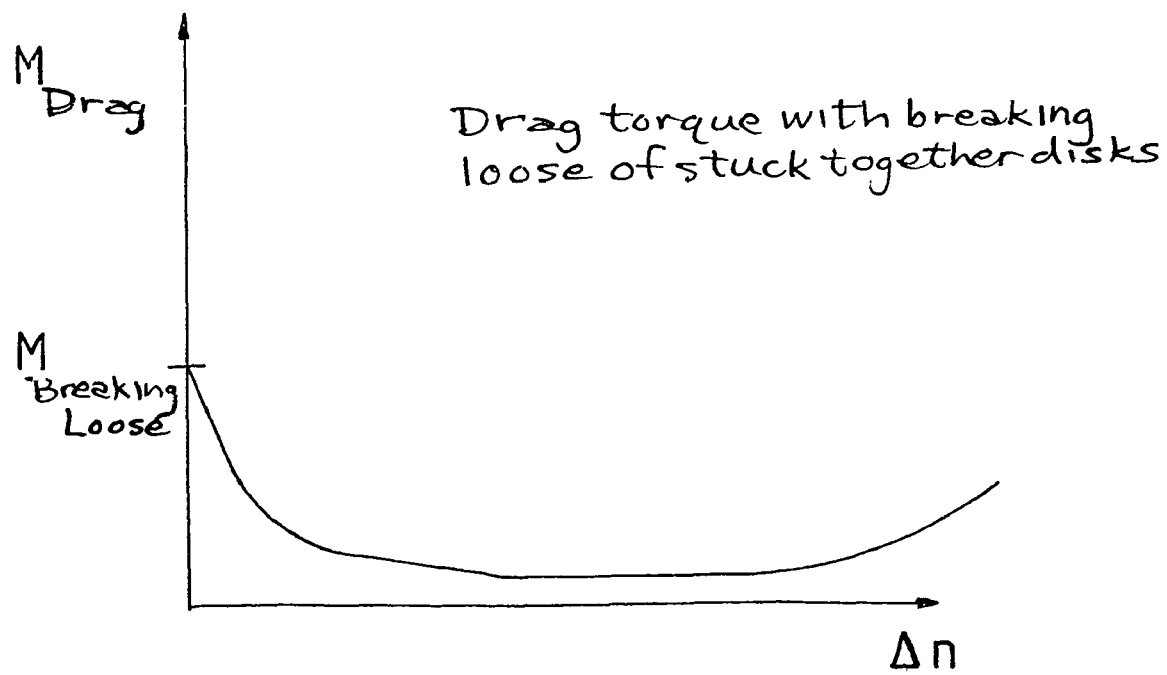
FIG. 5(b) shows a similar diagram of the typical course of the drag torque at very small differential speeds together with the break-loose torque in the case of disks which are sticking together.

FIG. 5a shows a typical or exemplary curve of the drag torque which occurs at low temperatures in the clutch device as a result of the presence of cooling oil of correspondingly high viscosity between the disks as a function of the differential rpm's "Δn" between the input side and the output side of the clutch arrangement in question. FIG. 5b shows the break-loose torque occurring at low temperatures as a result of adhering disks and the transition to the drag torque according to FIG. 5a. For further information, reference is made to the article "Drag torques in wet-running disk clutches" by N. Holzer and D. Frey, Friedrichshafen, and B. Matthes, Heidelberg, in VDI BERICHTE 1,323, pages 469–489, presented at a conference entitled "Clutches in Drive Systems '97" of the Society of German Engineers (VDI) for Development, Design, and Distribution on Mar. 3–4, 1997, in Fulda.

Figure 6:
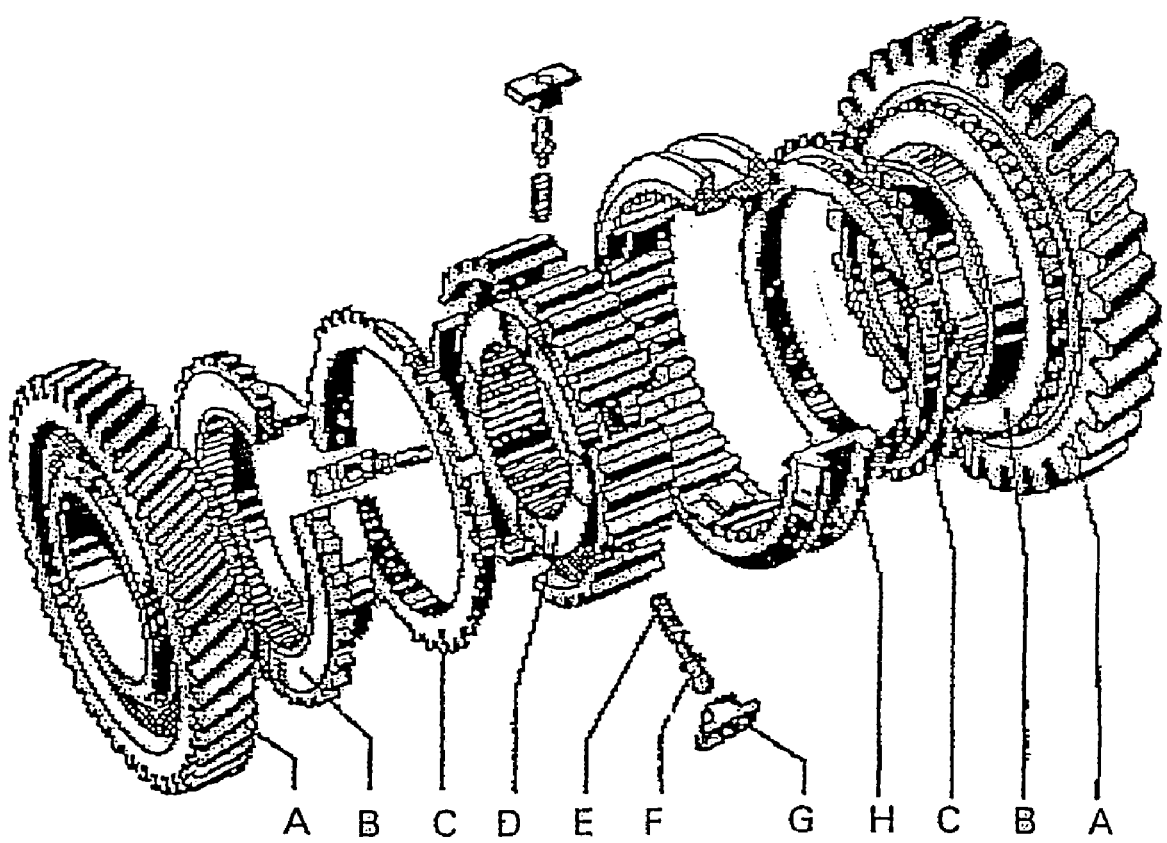
FIG. 6 shows by way of example a typical gearbox-synchronizing device according to the state of the art.

FIG. 6 shows an example of conventional single-cone synchronization according to the Borg-Warner system (ZF) with a loose, needle-supported wheel A; a clutch body B with shifting teeth and a friction cone; a primary function carrier, i.e., synchronizing ring C with countercone and locking teeth; a synchronizing body D with internal teeth for positive engagement with a gearbox shaft and with external teeth for the sliding selector sleeve; a compression spring E; a ball pin F; a thrust piece G; and a sliding selector sleeve H with claw-type internal teeth. If the attempt were made to engage a gear while the vehicle is stationary and the engine not running, it can happen that the attempt will fail because the shifting teeth of the clutch body of the gear wheel in question line up with the tooth flanks of the opposing gear wheel of the sliding selector sleeve of the synchronizing device, so that the teeth of the one component cannot mesh with those of the other to carry it along. A gear can therefore be engaged only when the shifting teeth of the clutch body fit into the gaps between the teeth of the opposing gear wheel.

Thus, in the case of the conventional design of the associated actuating mechanism, the idea of engaging a start-off gear before the drive unit is running and thus while the vehicle is still stationary is not a valid approach to solving the problem of engaging gears at low temperatures, i.e., the problem which arises from the fact that the synchronizing devices are not designed to overcome the drag torques.

Figure 7:
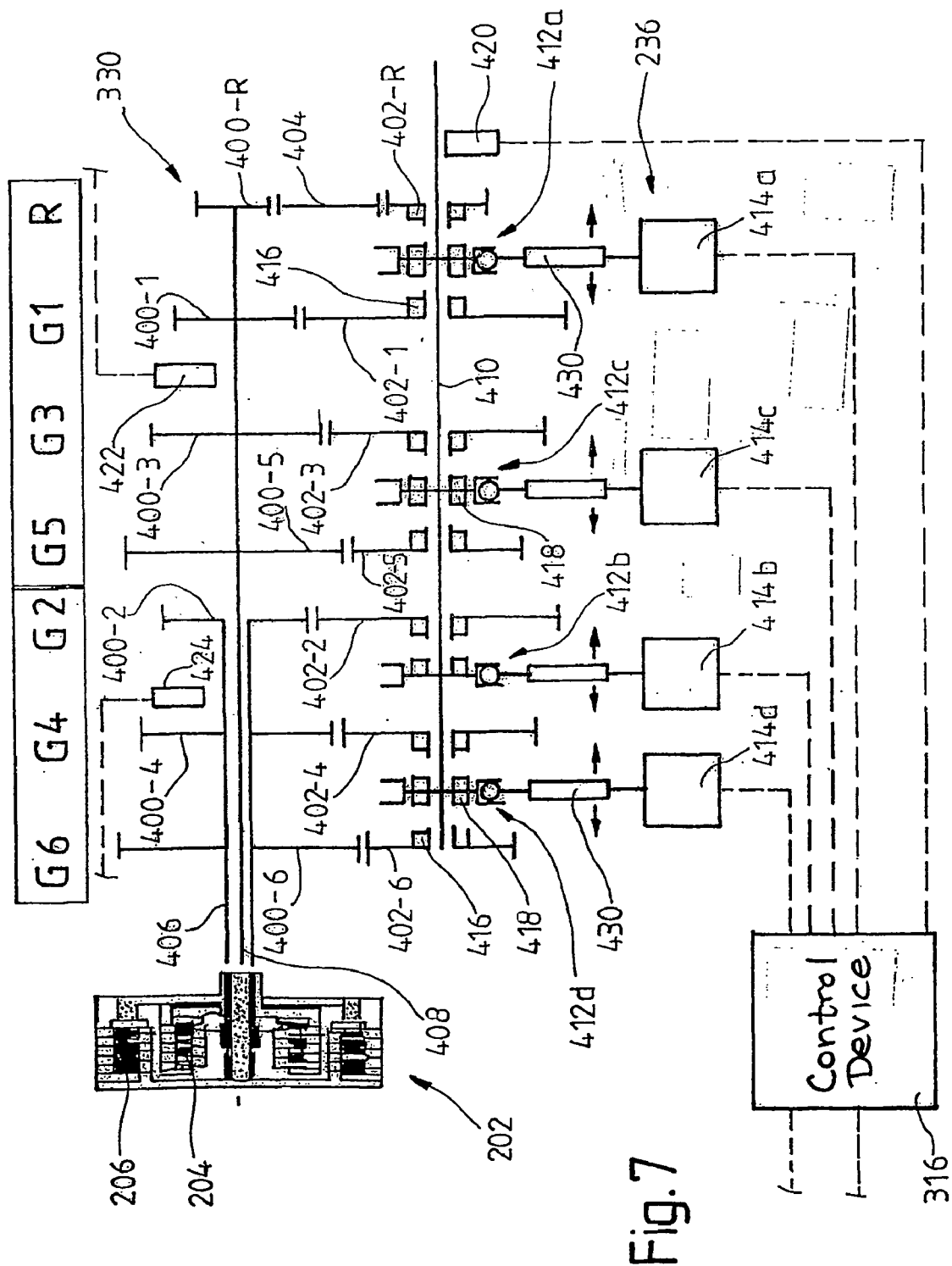
FIG. 7 shows a schematic diagram of an automatic double-clutch gearbox together with the upline double clutch.

FIG. 7 shows a schematic diagram of a double-clutch gearbox 330, which has seven gears, namely, six forward gears G1, G2, G3, G4, G5, and G6 and one reverse gear R. Each forward gear has a pair of gear wheels, consisting of a drive wheel 400-1, 400-2, 400-3, 400-4, 400-5, and 400-6 and a power takeoff wheel 402-1, 402-2, 402-3, 402-4, 402-5, and 402-6. The reverse gear R also has, in addition to a drive wheel 400-R and a power takeoff wheel 402-R, an intermediate rotational direction-changing gear wheel 404, which meshes with the drive wheel 400-R and the power takeoff wheel 402-R. The drive wheels assigned to the gears G2, G4, and G6 are connected nonrotatably to a radially outer gearbox input shaft 406, and the drive wheels assigned to the gears G1, G3, G5, and R are connected nonrotatably to a radially inner gearbox input shaft 408. The power takeoff wheels in question are supported rotatably on a gearbox output shaft 410 and can be connected nonrotatably to the output shaft by way of associated shifting and synchronizing devices 412a, 412b, 412c, and 412d, so that the gears can be shifted. The shifting and synchronizing devices 412a, 412c, and 412d are designed to be double-acting; that is, each one can shift either of two different gears. Thus, the synchronizing device 412a can shift the first forward gear G1 or the reverse gear R; the synchronizing device 412c can shift the third forward gear G3 or the fifth forward gear G5; and the synchronizing device 412d can shift the fourth forward gear G4 or the sixth forward gear G6. The synchronizing device 412b, however, is designed to function on only one side and serves to shift only the second forward gear G2.

As can be seen from the schematic diagram and/or as already mentioned, the gearbox input shafts 406 and 408 are coaxial to each other, and the odd-numbered gears G1, G3, and G5 and reverse gear R are assigned to the central gearbox input shaft 408, whereas the even-numbered gears G2, G4, and G6 are assigned to the gearbox input shaft 406, which is designed as a hollow shaft. Each of the two gearbox input shafts is connected to only one of the clutch arrangements 204 and 206; for example, the gearbox input shaft 406 is connected to the output side of the clutch arrangement 206, and the gearbox input shaft 408 is connected to the output side of the clutch arrangement 204. The input sides of the two clutch arrangements are connected to the power takeoff shaft of the drive unit, such as an internal combustion engine.

While the vehicle is being driven normally, one of the gears is engaged, and the clutch arrangement assigned to it is closed. During a shifting operation, first a target gear, such as the next-higher or next-lower forward gear, is selected, and then preferably a crossover shift, known in and of itself, takes place, during which the drive torque is transferred from the one gearbox input shaft to the other so that shifting occurs without any interruption in the tractive force.

In the exemplary embodiment shown, the double-clutch gearbox 330 is designed as an automated gearbox. For this purpose, an electrically motorized selector-actuating drive 414a, 414b, 414c, or 414d, for example, is assigned to each of the shifting and synchronizing devices 412a–412d; these selector-actuating drives act on their assigned shifting and synchronizing devices by means of, for example, a nonpositive and/or a positive actuating connection. By means of the selector-actuating drives, the shifting and synchronizing devices can be moved in the axial direction and subjected to the adjusting forces indicated by the double arrows. Driver formations 416 and 418 are indicated schematically on the power takeoff wheels and on the shifting and synchronizing devices; these formations engage with each other to connect the power takeoff wheel in question to the gearbox output shaft 410.

The selector-actuating drives are connected by associated control lines to the control unit 316 and can be controlled by it. The rotational speed of the gearbox output shaft, i.e., the gearbox power takeoff shaft 410, can be detected by an rpm sensor 420. In addition, rpm sensors 422 and 424 can also be assigned to the two gearbox input shafts to detect their rotational speeds, so that the control unit 316 can thus receive information as desired concerning all three rpm values. Another possibility, which can serve alternatively or in addition, is to use an rpm sensor connected to the control unit to detect the rpm's of the power takeoff shaft of the drive unit.

To make it easier to engage gears in a parked vehicle with disengaged gears, the connecting and actuating elements which produce the actuating connections and which are designed, for example, in the form of selector forks located between the shifting and synchronizing devices and the associated selector-adjusting drive, are designed with a certain elasticity, each one having, for example, a spring section 430. If, while the vehicle is still stationary and the engine is not yet running, the control unit 316 issues an appropriate command and the selector-adjusting drive, such as the selector-adjusting drive 414a, is actuated in such a way as to engage first gear or reverse gear, then either the gear is engaged immediately, if the driver formations of the power takeoff wheel in question and the associated driver formations of the shifting and synchronizing device in question are able to engage with each other (therefore, when, for example, the teeth of one set line up with the gaps between the teeth of the other set), or the gear is not engaged, if the so-called driver formations cannot fit into each other.

If an engagement of this type is not possible (because, for example, the teeth of the one set line up with the teeth of the other set), then the spring 430 serving as a force-storing device is put under tension. Let it be assumed that the temperature is low and that the starter is now actuated while the clutches are open. The break-loose and/or drag torques in the clutch arrangements thus cause a rotational movement to be imparted to the gear wheels on the clutch side or engine side, because, even though the clutch arrangements are open, the power train is still connected to the engine to some extent as a result of the break-loose or drag torques. The gear wheels on the gearbox power takeoff side, however, are stationary, because a parking brake is engaged and/or the vehicle is standing still with a released parking brake. The result is a relative rotation between the power takeoff wheels on the one hand and the associated shifting and synchronizing devices on the other, which brings these devices into a relative rotational position in which the driver formations can engage with each other (because, for example, the teeth of the one set now line up with the gaps between the teeth of the other set). Thus, in the case of a motor vehicle which has been parked with disengaged gears, it is still possible to engage a gear even at low temperatures.

Alternatively or additionally, the selector-actuating drives can also be designed to apply actuating forces which are greater than the normal ones for short periods of time. These forces would overload the shifting and synchronizing devices if they were to be exerted continuously, but in special situations (such as that in which the viscosity of the cooling oil for the disk clutch arrangements is high because of low temperatures) they make it possible advantageously for gears to be engaged or changed. A certain reduction in the service life of the shifting and synchronizing devices could, if necessary, be accepted in exchange, because these types of situations usually occur only rarely. In addition, the control unit 316 can be designed to increase the actuating forces only for short intervals and only under certain conditions, so that, in practice, the reduction in the service life of the shifting and synchronizing devices will be insignificant.

The control unit 316 can also have an operating mode in which, when a shift is made from a starting gear to a target gear, the gearbox input shaft assigned to the target gear is driven not only by the shifting and synchronizing device assigned to the target gear but also by another shifting and synchronizing device, which is provided in and of itself to act when shifting to a gear which is different from the target gear, but which is assigned to the same gearbox input shaft. For example, in preparation for and during the engagement of the first gear G1, not only the shifting and synchronizing device 412a but also the shifting and synchronizing device 412c could be actuated, so that these devices jointly bring the gearbox input shaft 408 at least approximately to a rotational speed which corresponds to the velocity of the vehicle at the moment in question under consideration of the transmission ratio in the target gear (which, in the present example, is first gear). Conversely, when the third gear G3 or the fifth gear G5 is being engaged, it is possible for the shifting and synchronizing device 412a to be actuated in the same way in addition to the shifting and synchronizing device 412c. The same is also true for the gears G2, G4, and G6 assigned to the gearbox input shaft 406. In each case, two different shifting and synchronizing devices (412b and 412d or 412a and 412c) can be actuated simultaneously for this purpose.

Care must be taken, however, to ensure that the wrong gear is not engaged by mistake. This can be avoided, for example, by having the control unit 316 compare the rotational speed of the gearbox input shaft in question and with that of the gearbox output shaft 420 (and/or that of the power takeoff shaft of the drive unit) under consideration of the gear ratios, especially of the gear ratio of the gear not to be engaged, and to release or at least to sufficiently decrease the actuating forces acting on the shifting and synchronizing device assigned to this not-to-be-engaged gear before the synchronizing point of the gear not to be engaged is reached.

As a result of the friction work which occurs in the shifting and synchronizing device assigned to the gear not to be engaged, a gear can be engaged or a shift from a starting gear to a target gear can be made even at low temperatures and in spite of the drag torques present in the clutch device 202.

The control unit 316 is advantageously designed to engage at least two gears simultaneously by way of the selector-actuating drives. The idea here is in particular to realize a parking brake by engaging two gears on the same gearbox input shaft. This measure is also known from DE 199 50 696 A1, which corresponds to U.S. 2002/189383.

It is also advantageous, however, for at least one gear to be engaged on the one gearbox input shaft and at least one gear to be engaged on the other gearbox input shaft, where the engaged gears preferably include at least one forward gear and reverse gear. These gears are preferably engaged under the complete automatic control of the control unit when the motor vehicle is being parked. When it is then desired to drive off again, it could be that, because of excessively low outside temperatures, high drag torques occur in the clutch device, so that it is no longer possible to engage a gear (unless the proposals made above have been realized). If, however, as proposed here, the reverse gear is engaged on the one gearbox input shaft and at least one forward gear is engaged on the other gearbox input shaft, then, by closing the one clutch arrangement and keeping the other clutch arrangement open or opening it, it is possible either to activate the forward gear or the reverse gear to drive off. It will be sufficient in many situations for only one gear, perhaps the forward gear, to be engaged, preferably under the completely automatic control of the control unit 316.

Aside from the aspect of the parking brake, it is also a very helpful approach from another standpoint to engage several gears on at least one of the gearbox input shafts, preferably on both gearbox input shafts, when the vehicle is parked. As a result of this measure, it is possible to select from among several gears when starting off. All of the gears which are not needed would then be disengaged; for example, reverse and all of the forward gears except the start-off gear would be disengaged.

To prevent the motor vehicle from moving uncontrollably when the engine is started when at least one gear is engaged and drag torques or break-loose torques are present in the clutch device because of low temperatures, it is preferable to provide a safety function in the control unit 316. The control unit 316 can, for example, allow the engine to be started only when the foot brake 450 (compare FIG. 1b) is actuated simultaneously. Starting or nonstarting can also be made dependent on the position of the shift lever 452 at the moment in question; for example, starting can be allowed only in parking mode "P".

It is also advantageous, for safety reasons, for the safety function, in spite of the fact that the shift lever 452 has been moved to reverse mode R or to driving mode D, to allow the release of the parking mode, in which, for example, a parking brake is necessarily activated, and to allow the change to R or D only if the foot brake 450 is being actuated simultaneously. This prevents the motor vehicle from moving uncontrollably when the parking brake is disengaged or, in the case where no gears have yet been engaged, when a forward start-off gear or reverse gear is engaged. Another possiblility is to link positively the release of parking mode or, in cases where gears are not yet engaged, the engagement of a gear, with an actuation of the vehicle brake system 454. Even if the driver has not actuated the brake pedal, it is then ensured automatically that the vehicle brakes are actuated in order to prevent the vehicle from moving uncontrollably.

It is possible to provide a vehicle creep function on the basis of the drag torques occurring in the clutch device. For this purpose, the control unit 316 can have a corresponding creep functionality.

It is preferable to provide a function whereby the clutch drag torques acting on the vehicle's wheels are compensated to zero or to a creep value or to a hill-holding value (in cases where a vehicle hill-holder function is present), this being accomplished, for example, by means of the vehicle brake system and/or by means of a coordinated actuation of the two clutch arrangements in the case that a forward gear is engaged on the gearbox input shaft assigned to the one clutch arrangement and reverse gear is engaged on the gearbox input shaft assigned to other clutch arrangement. Generally speaking, it is possible to use the vehicle's brake system or the appropriate actuation of at least one clutch arrangement to compensate a drive torque acting on the vehicle's wheels as a result of clutch drag torques and/or clutch disk adhesion torques to zero or to a nominal value by allowing the control unit 316 to control the vehicle's brake system 454 and/or the clutch device 202 or the clutch arrangement in question in an appropriate manner.

Reference is made again in the following to the condition in which a forward gear and a reverse gear are engaged simultaneously. Preferably these gears can remain engaged during start-off and during subsequent normal driving of the vehicle, and by actuating the two clutch arrangements in opposite direction it is possible to change between the forward gear and the reverse gear without the need to actuate the gearbox. As long as the reverse gear is engaged, it should be ensured by a safety function of the control unit 316 that a certain maximum vehicle velocity is not exceeded. It is also possible, however, to provide for the automatic disengagement of reverse gear in the case that the vehicle's velocity exceeds a threshold value.

The control unit 316 can advantageously have an active synchronizing mode, in which, by the appropriate control of the engine (usually the drive unit) and/or by appropriate actuation of the clutch arrangements, the rpm's of the gearbox input shaft assigned to the target gear at least adjusted toward the synchronizing ratio of the target gear, the rpm's of this gearbox input shaft preferably being brought to the synchronizing ratio of the target gear, to facilitate or to make possible the engagement of the target gear. As a result, the shifting and synchronizing devices do not have to work as hard, and it is not always necessary for several shifting and synchronizing devices to be put into service simultaneously; and, by taking advantage of the pretension of the actuating connection between the shifting and synchronizing device in question and the associated selector-actuating drive, it is also possible in such cases to eliminate the need to engage a gear. When this active synchronizing mode is used, an interruption in the tractive force during shifting must be accepted as unavoidable.

Figure 8:
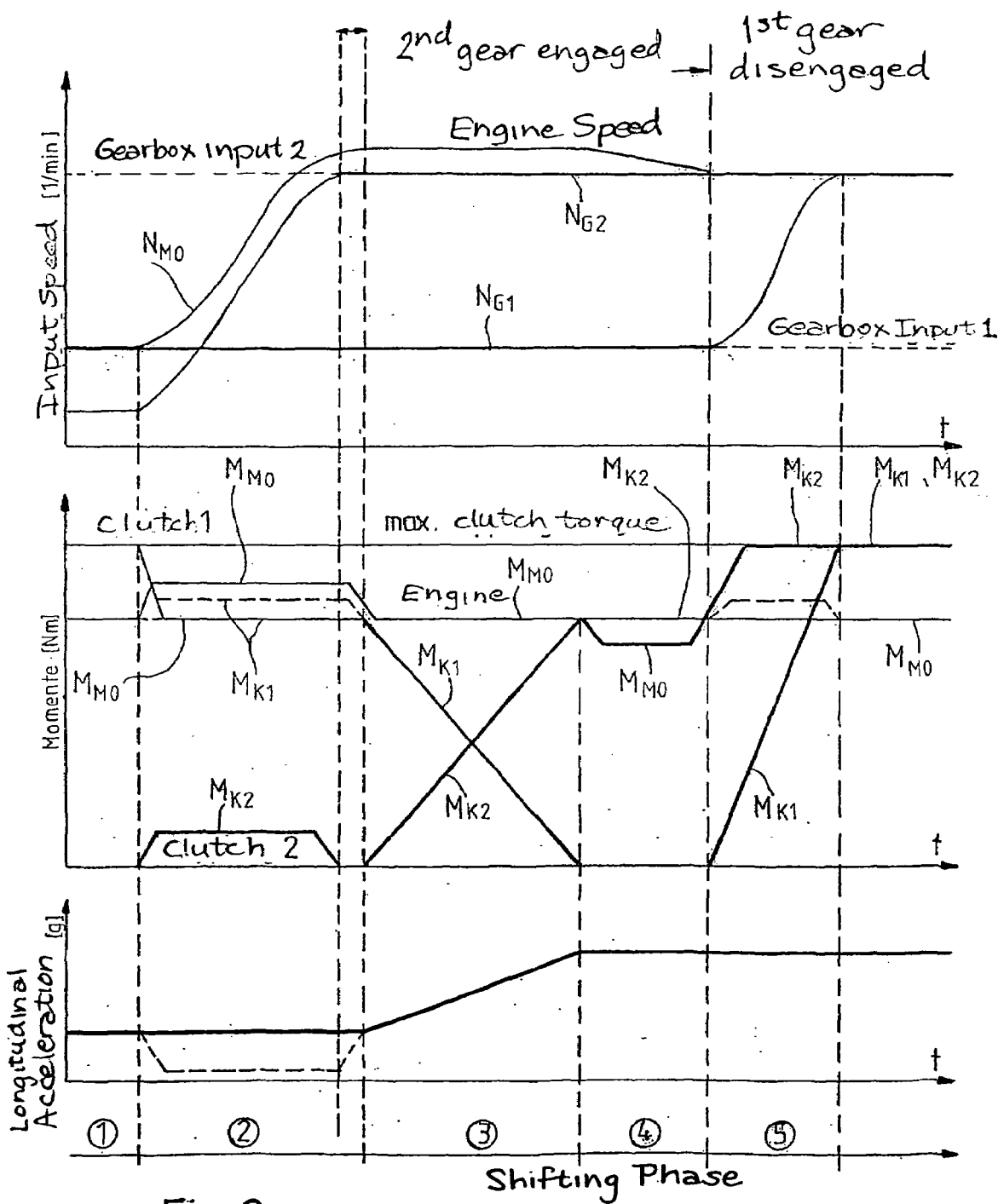
FIG. 8 shows an example of a shifting sequence according to the invention for pull-mode downshifting.

FIG. 8 shows an example of a shifting process for pull-mode downshifting, which makes it possible to downshift without an interruption in the tractive force and without the need for the shifting and synchronizing devices to perform an excessive amount frictional work to synchronize the gearbox input shaft assigned to the target gear, even when there are high drag torques present in the clutch device.

FIG. 8 is based on the following assumptions and nomenclature:

Reference is made to gearbox input shafts 1 and 2, to clutches 1 and 2, and to gears 1 and 2. Gearbox input shaft 1 can be the gearbox input shaft 406, and gear box input shaft 2 can be the gearbox input shaft 408, or vice versa. Accordingly, clutch 1 can correspond to the clutch arrangement 204, and clutch 2 can correspond to the clutch arrangement 206, or vice versa. Gear 1 is a gear assigned to gearbox input shaft 1 (the starting gear), and gear 2 is a gear assigned to gearbox input shaft 2 (the target gear). In a tractive operating mode, a shift is made from a higher gear 1 assigned to gearbox input shaft 1 to a lower gear 2 assigned to the gearbox input shaft 2.

During the type of shifting called "pull-mode downshifting", the engine is delivering positive torque to the gearbox. This torque is transferred via gearbox input shaft 1. Clutch 1 is connected to gearbox input shaft 1; clutch 2 is connected to gearbox input shaft 2. In the starting state, clutch 1 is completely closed and therefore in a state of excessive compression. Clutch 2 in the example shown here is open in the starting state. Thus, in the starting state, gearbox input shaft 1 turns at the same speed as the engine. A gear is engaged on gearbox input shaft 1, so that there is a flow of force between the gearbox input shaft 1 and the gear box output shaft.

A preferred shifting process comprising five shifting phases is illustrated schematically in FIG. 8. The phases are designated by the circled Arabic numerals 1–5 and are referred to in the following as phases I–V. Possible variants and embodiments of the shifting phases are shown in broken line in the figure. To distinguish the various curves and sections of curves from each other, they are identified by the code symbols $N_{Mo}$ for the engine rpm's, $N_{G1}$ for the rpm's of gearbox input shaft 1, $N_{G2}$ for the rpm's of gearbox input shaft 2, $M_{Mo}$ for the engine torque, $M_{K1}$ for the torque of clutch 1, and $M_{K2}$ for the torque of clutch 2. The partial diagrams for the rpm's do not take into account an additional contribution to the changes in the rpm's which results from the positive longitudinal acceleration (see partial diagram at the bottom) of the motor vehicle and which represents the change in the vehicle's velocity. For the sake of simplicity, furthermore, it is assumed that the engine torque remains constant in and of itself versus the engine rpm's (without any active interventions in engine control). The shifting process, calculated from the beginning of shifting phase I to the end of shifting phase V, could last for a period of, for example, approximately 0.5 second to 1 second.

If, in contrast to the assumptions made above and the curves in the diagram of FIG. 8, clutch arrangement 2 was also completely closed at the beginning, it could be opened completely as a way of initiating the shifting process in phase I.

In phase II, the clutch torque of clutch 1, namely, $M_{K1}$, is lowered to the torque of the engine present in phase I. The drive torque of the engine is increased, and clutch 2 is engaged slightly, so that now the engine torque is greater than the torque of clutch 1; the clutch thus begins to slip, and the engine speed increases until, toward the end of phase II, it reaches a rotational speed above the synchronizing speed of the target gear 2. By engaging clutch 2 slightly, gearbox input shaft 2 is accelerated, so that its rpm's approach the synchronizing speed of the target gear. At the end of phase II, the target gear (gear 2) is engaged, so that, with the cooperation of the gearbox synchronizing device assigned to the target gear, gearbox input shaft 2 reaches the synchronizing speed of the target gear, and thus the target gear is engaged.

In phase III, after the selected engine speed above the speed of gearbox input shaft 2 has been reached, the engine torque is lowered again to the original torque in order to prevent the engine speed from increasing further. Clutch 1 is slipping, and a selected rpm value for the slip between gearbox input shaft 1 and the engine speed is reached automatically by means of clutch 1. Clutch 2 is closed under open-loop control. As a result, clutch 1 is now opened under closed-loop control, because the previously selected slip rpm value can be kept constant only when the sum of the torques transferred by the two clutches to the gearbox input shafts and thus, via the gearbox, to the gearbox output shaft remains equal to the selected engine torque. Clutch 2 keeps accepting more engine torque until clutch 1 is completely open. Clutch 2 can now transfer all of the engine torque and is not closed any further. Instead of the closing of clutch 2 under open-loop control and the opening of clutch 1 under closed-loop control, it would also be possible for clutch 1 to be opened under open-loop control and for clutch 2 to be closed under closed-loop control.

In phase IV, the engine speed is reduced to the speed of gearbox input shaft 2 by lowering the engine torque below the clutch torque. In phase V, clutch II is completely closed. Clutch 1 can also be closed, which leads to an increase in the speed $N_{G1}$ of gearbox input shaft 1 to the level of the gearbox input shaft 2. In the shifting process according to the diagram, the engine torque has already been returned to the original value by the end of phase IV.

A variant of phase II is also shown, according to which the torque of clutch 1 is not quite reduced to the value of the starting engine torque; the purpose here is to avoid an undesirable negative intermediate acceleration of the vehicle from occurring as a result of the acceleration of gearbox input shaft 2. It is also possible to increase the engine torque to a value above the original value in phase V to compensate for the acceleration energy required to accelerate gearbox input shaft 1.

The entire course of the acceleration process during the operation of the clutch can be made to proceed monotonically, without any intermediate decelerations or intermediate accelerations, by supplying the starting engine torque to the gearbox by means of the gearbox input shafts at all times and by transferring this torque to the gearbox output shaft in accordance with the transmission ratios in the starting gear and target gear. At the gearbox output shaft, therefore, there will be an essentially constant (phases I, II, IV, V) or monotonically increasing (preferably strictly monotonic, e.g., linear) drive torque at all times.

According to a shifting sequence such as that proposed by way of example in FIG. 8, downshifting is possible without any significant load on the synchronizing devices even at low temperatures and high cooling oil viscosities, without the need to forgo power-shifting and the continuity of the tractive force.

During upshifting, the gearbox input shaft synchronizing speed assigned to the target gear is below that of the previous gear. If the clutch assigned to the target gear is open, the rpm's of the gearbox input shaft assigned to the target gear can be between zero and the new synchronizing speed as a result of a separate braking device and/or on the basis of drag torques in the gearbox. By closing the clutch assigned to the target gear, the gearbox input shaft assigned to the target gear can be brought to the new synchronizing speed to make possible or to facilitate the engagement of a gear. There is no need to forgo power-shifting and the continuity of the tractive force.

The measures described above, which are intended to solve the problems associated with drag torques in the clutch device at low temperatures, are no longer absolutely necessary once operating conditions have returned to normal. The control unit 316 can therefore be provided with the ability to release the system automatically to allow normal shifting and clutch operation and a free choice of gears. For this purpose, the control unit can receive a temperature signal from, for example, a temperature sensor, which measures the temperature of the cooling oil, and compare this with a threshold value. Under certain conditions, the viscosity of the cooling oil can be determined from the measured temperature, and this can be compared with a predetermined threshold value. The control unit can also be designed to derive the drag torque-determining temperature from other measurement values, possibly temperature values, on the basis of, for example, a temperature model.

For the active reduction of the drag torques, the control unit 316 can have a function which serves to actuate the pump 209 (compare FIG. 2) in such a way that only just enough cooling oil is supplied to the clutch arrangements as is necessary at that particular moment, this amount depending on, for example, the power loss occurring in the clutch device and/or the amount of lubricant required by the disks. Under certain conditions, the cooling oil flow to the clutch arrangements can also be stopped completely if there is no need for it at the moment in question.

It is also possible for the control unit to be designed to allow the engine to be started only if the viscosity of the cooling oil does not exceed a maximum value or the temperature of the cooling oil is not below a critical value. This measure is especially of interest in connection with the measures discussed here which make it possible to heat the cooling oil regardless of whether the engine is running or not (compare heaters 322, 324 and the circulation mode in conjunction with the valve 232). It is also possible for the vehicle to be prepared for parking in such a way that, when the vehicle is put back into operation, the drag torques and break-loose torques in the clutch device are minimized and in the ideal case almost completely eliminated. Thus the control unit can be designed to recognize when the motor vehicle is about to be parked or when it is being parked (the control unit can respond in this case to the movement of the shift lever 452 to position "P", for example), and, in response to this parking, to disengage the clutch devices and then to increase the cooling oil pressure or the flow of cooling oil to the clutch arrangements for a certain period of time in order to push the disks of the clutch arrangements apart, that is, to separate the outer disks from the inner disks. This is done preferably in a completely automatic fashion by the appropriate actuation of the pump 209 by the control unit 316. Alternatively or in addition, after it has been recognized that the vehicle is about to be parked or is being parked, the control unit 316 can respond to this parking by actuating the drive unit, even after the clutch arrangements have been disengaged, in such a way that it runs for a certain time at a speed significantly faster than idling speed. As a result of centrifugal force, the cooling oil will thus be spun away from the sets of disks in a radially outward direction. When this is done, it is preferable for the flow of cooling oil to the disks to be stopped first.

Operating the drive unit with disengaged clutch arrangements at a speed considerably faster than idling speed is also advantageous as a way of preparing for the engagement of at least one gear, because the smaller the amount of cooling oil between the disks, the smaller the drag torque. The control unit 316 is preferably therefore also designed to detect the engagement of a gear, i.e., the desire to engage a gear, and to actuate the drive unit with disengaged clutch arrangements in the manner indicated. For example, the control unit 316 can respond to a movement of the shift lever 452 to position "R" or "D" and not actually engage the gear in question until after the drive unit has been accelerated as proposed.

It has been found that disks which are sticking together can be separated or that this separation can at least be assisted by the actuation of the clutch arrangements themselves. This beneficial effect is attributable to the mechanical distortion of the clutch arrangements which occurs in association with clutch actuation movements and the displacement of the disks during such actuations. The control unit 316 is preferably designed to respond to the desire to engage a gear or to the engagement of the gear and to actuate the clutch arrangements at least once, preferably several times in succession, in the engaging and disengaging directions to achieve the beneficial effect mentioned before the gear is engaged or before the process of engaging the gear has been completed.

It has also been found that speed irregularities acting on the clutch device such as rotational vibrations have the effect of separating or at least of assisting the separation of disks which are sticking to each other. The control unit 316 is therefore preferably designed to actuate the drive unit, especially the internal combustion engine, while the drive unit is running in such a way that these types of speed irregularities occur. For example, in the case of an internal combustion engine, cylinders can be turned off or cylinders can be supplied alternately or nonuniformly with fuel.

Among other things, measures for eliminating or reducing the drag torques which occur in a disk-type multiple-clutch device as a result of the temperature-related increase in the viscosity of the operating fluid supplied to the disks during operation are proposed in order to make it possible to put a motor vehicle into operation or to allow the operation of the motor vehicle even at low temperatures.

What is claimed is:

1. A power train for a motor vehicle, said power train comprising:
    a drive unit;
    a gearbox with a first gearbox input shaft and a second gearbox input shaft; and
    a clutch device with a first multi-disk clutch arrangement, which is assigned to the first gearbox input shaft, and a second multi-disk clutch arrangement, which is assigned to the second gearbox input shaft, for transmitting torque between the drive unit and the gearbox;
    a pump arrangement for supplying operating fluid to the clutch arrangements for operation under the action of the operating fluid,
    wherein the pump arrangement or a flow-adjusting device includes at least one hydraulic valve that can be controlled by a control unit to adjust the instantaneous flow of operating fluid through a coolant circuit to the disk clutch arrangements independent of an operating state of the disk clutch arrangements, and
    a temperature sensing device configured to detect the temperature of the operating fluid in the coolant circuit, the control unit is designed to increase or to decrease the flow of operating fluid in the coolant circuit by operating the at least one hydraulic valve as a function of the instantaneous demand for the supply of operating medium to at least one of the clutch arrangements and in response to the temperature sensing device in such a way that the control unit decreases or interrupts the flow of operating fluid in the coolant circuit when the supply demand is low and increases the flow of operating fluid in the coolant circuit when the supply demand is high.

2. A power train as in claim 1 wherein the control unit determines the supply demand in view of at least one of a power loss occurring at the clutch arrangement and the demand for lubricant at the disks of the clutch arrangement.

3. A power train for a motor vehicle, said power train comprising:
    a drive unit;
    a gearbox with a first gearbox input shaft and a second gearbox input shaft; and
    a clutch device with a first multi-disk clutch arrangement, which is assigned to the first gearbox input shaft, and a second multi-disk clutch arrangement, which is assigned to the second gearbox input shaft, for transmitting torque between the drive unit and the gearbox,
    a pump arrangement for supplying operating fluid to the clutch arrangements for operation under the action of the operating fluid, and
    wherein the pump arrangement or the flow-adjusting device and/or a pump arrangement assigned to a hydraulic actuating device for the clutch arrangements can be operated in a circulating mode, in which, by the circulation of operating fluid, thermal energy can be introduced into the operating fluid independently of the supply demand for operating fluid to the clutch arrangements and/or independently of the actuation of the clutch device.

4. A power train as in claim 3 wherein a bypass can be opened to allow the operating medium to pass around the clutch arrangements.

5. A power train as in claim 3 further comprising a control unit is designed to respond to an event indicating the impending starting of the motor vehicle by initiating the circulating mode.

6. A power train as in claim 3 further comprising a control unit is designed to automatically initiate the circulating mode when at least one positive condition is fulfilled and/or at least one negative condition is not fulfilled.

7. A power train as in claim 3 further comprising a control unit is designed to automatically terminate the circulating mode when at least one positive condition is fulfilled and/or at least one negative condition is not fulfilled.

8. A power train as in claim 3 further comprising a control unit is designed to release and to block the starting of the drive unit as a function of an instantaneous viscosity state of the operating medium.

* * * * *

UNITED STATES PATENT AND TRADEMARK OFFICE
CERTIFICATE OF CORRECTION

PATENT NO.         : 7,207,922 B2
APPLICATION NO. : 11/141924
DATED              : April 24, 2007
INVENTOR(S)       : Jochen Kuhstrebe It is certified that error appears in the above-identified patent and that said Letters Patent is hereby corrected as shown below:

Title page, insert item (30):

(30) Foreign Application Priority Data

Jan. 12, 2001   (DE)    101 01 176
    Oct. 1, 2001    (DE)    101 48 424

Signed and Sealed this

Thirty-first Day of July, 2007

JON W. DUDAS
*Director of the United States Patent and Trademark Office*

UNITED STATES PATENT AND TRADEMARK OFFICE
CERTIFICATE OF CORRECTION

PATENT NO. : 7,207,922 B2  Page 1 of 1
APPLICATION NO. : 11/141924
DATED : April 24, 2007
INVENTOR(S) : Jochen Kuhstrebe It is certified that error appears in the above-identified patent and that said Letters Patent is hereby corrected as shown below:

Title page, item (73) should read as follows:

(73) Assignee:   ZF Sachs AG, Schweinfurt (DE); and

Volkswagen AG, Wolfsburg (DE)

Signed and Sealed this
Twenty-sixth Day of July, 2011

David J. Kappos
*Director of the United States Patent and Trademark Office*